(12) United States Patent
Sakurai et al.

(10) Patent No.: US 11,530,287 B2
(45) Date of Patent: Dec. 20, 2022

(54) CONJUGATED-DIENE-BASED RUBBER

(71) Applicants: ZEON CORPORATION, Tokyo (JP);
SUMITOMO CHEMICAL COMPANY, LIMITED, Tokyo (JP);
ZS ELASTOMERS CO., LTD., Tokyo (JP)

(72) Inventors: Takuro Sakurai, Tokyo (JP); Takashi Iizuka, Tokyo (JP); Mana Fujii, Sodegaura (JP); Hisakatsu Hama, Sodegaura (JP)

(73) Assignees: ZEON CORPORATION, Tokyo (JP);
SUMITOMO CHEMICAL COMPANY, LIMITED, Tokyo (JP);
ZS ELASTOMERS CO., LTD., Tokyo (JP)

( * ) Notice: Subject to any disclaimer, the term of this patent is extended or adjusted under 35 U.S.C. 154(b) by 256 days.

(21) Appl. No.: 16/753,882

(22) PCT Filed: Sep. 28, 2018

(86) PCT No.: PCT/JP2018/036453
§ 371 (c)(1),
(2) Date: Apr. 6, 2020

(87) PCT Pub. No.: WO2019/073828
PCT Pub. Date: Apr. 18, 2019

(65) Prior Publication Data
US 2020/0262961 A1    Aug. 20, 2020

(30) Foreign Application Priority Data
Oct. 13, 2017  (JP) .............................. JP2017-199790

(51) Int. Cl.
| | | |
|---|---|---|
| C08F 297/04 | (2006.01) | |
| C08K 3/36 | (2006.01) | |
| B60C 1/00 | (2006.01) | |
| B60C 11/00 | (2006.01) | |

(52) U.S. Cl.
CPC .......... *C08F 297/04* (2013.01); *B60C 1/0016* (2013.01); *B60C 11/0008* (2013.01); *C08K 3/36* (2013.01); *B60C 2011/0025* (2013.01); *C08F 2500/21* (2013.01)

(58) Field of Classification Search
CPC .......... C08F 297/04; C08K 3/36; B60C 1/00; B60C 11/00
USPC ........................................................ 524/575
See application file for complete search history.

(56) References Cited

U.S. PATENT DOCUMENTS

| | | | |
|---|---|---|---|
| 2014/0114014 A1 | 4/2014 | Tokimune et al. | |
| 2015/0133600 A1* | 5/2015 | Iizuka ................. | C08F 297/046 524/573 |
| 2017/0137555 A1* | 5/2017 | Sakurai ................. | C08F 236/08 |

FOREIGN PATENT DOCUMENTS

| | | | |
|---|---|---|---|
| JP | 2016-037543 A | 3/2016 | |
| WO | 2013/018424 A1 | 2/2013 | |
| WO | WO-2015199226 A1 * | 12/2015 | ............... B60C 1/00 |

OTHER PUBLICATIONS

Jul. 1, 2021 Extended European Search Report issued in European Patent Application No. 18867046.7.
Dec. 11, 2018 Search Report issued in International Patent Application No. PCT/JP2018/036453.
Apr. 14, 2020 International Preliminary Report on Patentability issued in International Patent Application No. PCT/JP2018/036453.

* cited by examiner

*Primary Examiner* — Deve V Hall
(74) *Attorney, Agent, or Firm* — Oliff PLC

(57) ABSTRACT

A conjugated diene-based rubber including a polymer block (A) containing isoprene monomer unit as the main component and a polymer block (B) containing 1,3-butadiene monomer unit as the main component, wherein at least one of the polymer block (A) and the polymer block (B) contains a unit of a vinyl compound having a functional group interactive with silica, the polymer block (A) has a weight average molecular weight (Mw) in the range of 1,000 to 30,000, and the entire conjugated diene-based rubber has a weight average molecular weight (Mw) in the range of 50,000 to 5,000,000.

9 Claims, No Drawings

CONJUGATED-DIENE-BASED RUBBER

TECHNICAL FIELD

The present invention relates to a conjugated diene-based rubber, and more specifically relates to a conjugated diene-based rubber which can be prepared into a rubber composition which is effectively prevented from adhering to rolls and can provide a cross-linked rubber having excellently low heat buildup and high operation stability.

BACKGROUND ART

Recent environmental and resource issues lead to strong demands for tires for automobiles having lower fuel consumption. Cross-linked rubbers prepared from a rubber composition comprising a rubber and silica as a filler have lower heat buildup than that of cross-linked rubbers prepared from a rubber composition comprising carbon black, and thus result in a reduction in rolling resistance when incorporated in tires. For this reason, tires having excellently low fuel consumption can be obtained by producing tires using a cross-linked rubber prepared from a rubber composition containing silica.

A variety of attempts have been made in rubbers contained in such a rubber composition to increase the compatibility between the rubbers and silica. For example, in Patent Document 1, a technique of imparting compatibility with silica to a rubber itself is examined, in which monomer components including a silicon-containing vinyl compound and a conjugated diene compound are polymerized in the presence of a specific polymerization initiator when a rubber polymer is prepared through solution polymerization.

RELATED ART DOCUMENTS

Patent Documents

Patent Document 1: WO2013/018424

SUMMARY OF THE INVENTION

Problem to be Solved by the Invention

In consideration of a recently increasing demand for the performance of tires for automobiles, new development of tires hereafter requires a rubber which can provide a cross-linked rubber having lower heat buildup than that of conventional rubbers such as the rubber disclosed in Patent Document 1.

The present invention has been made in consideration of such a problem, and an object of the present invention is to provide a conjugated diene-based rubber which can be prepared into a rubber composition which is effectively prevented from adhering to rolls and can provide a cross-linked rubber having excellently low heat buildup and high operation stability.

Means for Solving Problems

The present inventors, who have conducted extensive research to achieve the above goal, have found that the goal can be achieved by preparing a conjugated diene-based rubber comprising a polymer block containing isoprene monomer unit as the main component and having a weight average molecular weight (Mw) in a specific range and a polymer block containing 1,3-butadiene monomer unit as the main component, at least one of the polymer blocks containing a unit of a vinyl compound having a functional group interactive with silica, and thus have completed the present invention.

In other words, the present invention provides a conjugated diene-based rubber comprising a polymer block (A) containing isoprene monomer unit as the main component and a polymer block (B) containing 1,3-butadiene monomer unit as the main component, wherein at least one of the polymer block (A) and the polymer block (B) contains a unit of a vinyl compound having a functional group interactive with silica, the polymer block (A) has a weight average molecular weight (Mw) in the range of 1,000 to 30,000, and the entire conjugated diene-based rubber has a weight average molecular weight (Mw) in the range of 50,000 to 5,000,000.

In the conjugated diene-based rubber according to the present invention, the proportion of the unit of the vinyl compound having a functional group interactive with silica is preferably 0.01 to 20 wt % of the total monomer units forming the conjugated diene-based rubber.

In the conjugated diene-based rubber according to the present invention, at least one of the polymer block (A) and the polymer block (B) preferably includes aromatic vinyl monomer unit.

In the conjugated diene-based rubber according to the present invention, the polymer block (B) preferably has a hetero atom-containing terminal functional group.

The present invention provides a method of producing the conjugated diene-based rubber according to any of the embodiments above, the method comprising: a step of polymerizing a monomer (a) including isoprene in an inert solvent in the presence of a polymerization initiator to form the polymer block (A) having an active terminal; and a step of mixing and continuously polymerizing the polymer block (A) having an active terminal with a monomer (b) including 1,3-butadiene to yield a conjugated diene-based polymer chain including the polymer block (A) and the polymer block (B) and having an active terminal, wherein at least one of the monomer (a) and the monomer (b) contains a vinyl compound having a functional group interactive with silica.

Preferably, the method of producing the conjugated diene-based rubber according to the present invention further comprises a step of reacting a hetero atom-containing compound with the active terminal of the conjugated diene-based polymer chain having an active terminal.

The present invention also provides a rubber composition comprising a rubber ingredient containing the conjugated diene-based rubber according to any of the embodiments above, and silica.

Preferably, the rubber composition according to the present invention further comprises a cross-linking agent.

Furthermore, the present invention provides a cross-linked rubber prepared by cross-linking the rubber composition, and a tire comprising the cross-linked rubber.

Effects of Invention

The present invention can provide a conjugated diene-based rubber which can be prepared into a rubber composition which is effectively prevented from adhering to rolls and can provide a cross-linked rubber having excellently low heat buildup and high operation stability. The present invention can also provide a method of producing such a conjugated diene-based rubber, and a rubber composition, a cross-linked rubber, and a tire comprising such a conjugated diene-based rubber.

DESCRIPTION OF EMBODIMENTS

Conjugated Diene-Based Rubber

The conjugated diene-based rubber according to the present invention comprises a polymer block (A) containing isoprene monomer unit as the main component and a polymer block (B) containing 1,3-butadiene monomer unit as the main component, wherein at least one of the polymer block (A) and the polymer block (B) contains a unit of a vinyl compound having a functional group interactive with silica, and the polymer block (A) has a weight average molecular weight (Mw) in the range of 1,000 to 30,000, and the entire conjugated diene-based rubber has a total weight average molecular weight (Mw) in the range of 50,000 to 5,000,000.

Such a conjugated diene-based rubber according to the present invention can be prepared into a rubber composition which is effectively prevented from adhering to rolls and can provide a cross-linked rubber having excellently low heat buildup and high operation stability.

In particular, the present inventors have conducted extensive research on a further reduction in heat buildup in consideration of the recently increasing demand for the performance of tires for automobiles, and have found that a conjugated diene-based rubber has further enhanced compatibility with a filler such as silica and therefore ensures further reduced heat buildup, the conjugated diene-based rubber comprising a polymer block (A) containing isoprene monomer unit as the main component and having a weight average molecular weight (Mw) in a specific range and a polymer block (B) containing 1,3-butadiene monomer unit as the main component, at least one of these polymer blocks containing a unit of a vinyl compound having a functional group interactive with silica. The present inventors also have found that such a rubber not only reduces the heat buildup but also enhances the operation stability. In particular, because the operation stability can be enhanced by sufficiently demonstrated reinforcing properties of the filler such as silica, it is considered that the above structure enables the filler such as silica to sufficiently demonstrate reinforcing properties.

Furthermore, in addition to this, the present inventors have examined and found that the conjugated diene-based rubber according to the present invention having such a structure also has an unexpected effect, which is completely different from reduced heat buildup and indicates that when the rubber is prepared into a rubber composition containing a filler such as silica and the rubber composition is processed into a sheet using rolls, the adhesion of the rubber composition to the rolls can be effectively reduced. In particular, when the rubber composition is processed into sheets using rolls, such effectively reduced adhesion to the roll also leads to higher processability.

The polymer block (A) to be used may be any polymer block containing isoprene monomer unit as the main component. The polymer block (A) may consist of only isoprene monomer unit, or may consist of isoprene monomer unit and monomer unit other than the isoprene monomer unit. In this case, suitable examples of the monomer unit other than the isoprene monomer unit include aromatic vinyl monomer unit. The polymer block (A) according to the present invention preferably contains the isoprene monomer unit and aromatic vinyl monomer unit.

The proportion of the isoprene monomer unit contained in the polymer block (A) is preferably 50 wt % or more, more preferably 70 wt % or more, still more preferably 90 wt % or more. Although not particularly limited, the upper limit of the proportion of the isoprene monomer unit is preferably 99 wt % or less. By controlling the proportion of the isoprene monomer unit contained in the polymer block (A) within this range, the compatibility of the conjugated diene-based rubber with the compounding agent such as silica compounded with the conjugated diene-based rubber can be further enhanced, thereby providing a cross-linked rubber having further reduced heat buildup.

Examples of aromatic vinyl compounds for forming the aromatic vinyl monomer unit include styrene, methylstyrene, ethylstyrene, t-butylstyrene, α-methylstyrene, α-methyl-p-methylstyrene, chlorostyrene, bromostyrene, methoxystyrene, dimethylaminomethylstyrene, dimethylaminoethylstyrene, diethylaminomethylstyrene, diethylaminoethylstyrene, cyanoethylstyrene, vinylnaphthalene, and the like. Among these, styrene is preferred. The proportion of the aromatic vinyl monomer unit contained in the polymer block (A) is preferably 50 wt % or less, more preferably 30 wt % or less, still more preferably 10 wt % or less. Although not particularly limited, the lower limit of the proportion of the aromatic vinyl monomer unit is preferably 1 wt % or more.

In the conjugated diene-based rubber according to the present invention, at least one of the polymer block (A) and the polymer block (B) described later contains a unit of a vinyl compound having a functional group interactive with silica. Hereinafter, the case where the polymer block (A) contains unit of such a vinyl compound having a functional group interactive with silica will be exemplified. It is sufficient that the unit of the vinyl compound having a functional group interactive with silica are contained in at least one of the polymer block (A) and the polymer block (B) described later. Accordingly, if contained in the polymer block (B) described later, the unit of the vinyl compound having a functional group interactive with silica do not always need to be contained in the polymer block (A).

The vinyl compound having a functional group interactive with silica for forming the unit of the vinyl compound having a functional group interactive with silica can be any compound having a functional group interactive with silica and a vinyl group. Here, the functional group interactive with silica indicates a functional group which forms a covalent bond between the functional group and the silica surface or can cause an intermolecular force weaker than the covalent bond (such as ion-dipole interaction, dipole-dipole interaction, hydrogen bond, or van der Waals force). Examples of such a functional group interactive with silica include, but should not be limited to, nitrogen atom-containing functional groups, silicon atom-containing functional groups, oxygen atom-containing functional groups, and the like. Among these, silicon atom-containing functional groups are preferred because they are highly interactive with silica.

As a preferred aspect of the vinyl compound having a functional group interactive with silica, the vinyl compound containing a silicon atom-containing functional group which can be suitably used is, for example, a compound represented by General Formula (1):

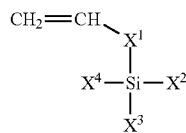
(1)

where $X^1$ represents a chemical single bond or a hydrocarbylene group, and $X^2$, $X^3$, and $X^4$ each independently represent a substituted amino group, a hydrocarbyloxy group, or an optionally substituted hydrocarbyl group.

In General Formula (1), $X^1$ is a chemical single bond or a hydrocarbylene group, preferably a chemical single bond. Examples of the hydrocarbylene group include alkylene, alkenediyl, and arylene groups, groups of arylene groups bonded to alkylene groups, and the like.

Examples of the alkylene groups include a methylene group, an ethylene group, a trimethylene group, and the like. Examples of the alkenediyl groups include a vinylene group, an ethylene-1,1-diyl group, and the like. Examples of the arylene groups include a phenylene group, a naphthylene group, a biphenylene group, and the like. Examples of the groups of arylene groups bonded to alkylene groups include a group of a phenylene group bonded to a methylene group, a group of a phenylene group bonded to an ethylene group, and the like. If $X^1$ is the hydrocarbylene group, $X^1$ is preferably an arylene group, more preferably a phenylene group.

In General Formula (1), $X^2$, $X^3$, and $X^4$ each independently represent a substituted amino group, a hydrocarbyloxy group, or an optionally substituted hydrocarbyl group. It is preferred that at least one of $X^2$, $X^3$, and $X^4$ be the substituted amino group, and it is more preferred that two of $X^2$, $X^3$, and $X^4$ are the substituted amino groups.

A suitable substituted amino group which forms $X^2$, $X^3$, and $X^4$ is a group represented by General Formula (2):

(2)

where $R^1$ and $R^2$ are may or may not be bonded to each other; if $R^1$ and $R^2$ are not bonded to each other, $R^1$ and $R^2$ each independently represent an optionally substituted hydrocarbyl group or a trihydrocarbylsilyl group; if $R^1$ and $R^2$ are bonded to each other, $R^1$ and $R^2$ represent a hydrocarbylene group optionally containing a nitrogen atom and/or an oxygen atom.

Examples of the hydrocarbyl group which can form $R^1$ and $R^2$ include linear alkyl groups such as a methyl group, an ethyl group, a n-propyl group, an isopropyl group, a n-butyl group, an isobutyl group, a sec-butyl group, a tert-butyl group, a n-pentyl group, a n-hexyl group, and a n-octyl group; cyclic alkyl groups such as a cyclopentyl group and a cyclohexyl group; aryl groups such as a phenyl group, a benzyl group, and a naphthyl group; and the like. Among these, the linear alkyl groups are preferred, and the methyl group or the ethyl group is more preferred.

If the hydrocarbyl group which can form $R^1$ and $R^2$ has a substituent, examples thereof include hydrocarbyl groups having a hydrocarbyloxy group as a substituent. Examples of the hydrocarbyl groups having a hydrocarbyloxy group as a substituent include alkoxyalkyl groups such as a methoxymethyl group, an ethoxymethyl group, and a methoxyethyl group; aryloxyalkyl groups such as a phenoxymethyl group; and the like.

Specific examples of the trihydrocarbylsilyl group which can form $R^1$ and $R^2$ include trialkylsilyl groups such as a trimethylsilyl group, a triethylsilyl group, a tert-butyldimethylsilyl group, and the like.

If $R^1$ and $R^2$ are bonded to each other, examples of the hydrocarbylene group which can form $R^1$ and $R^2$ include alkylene groups such as a trimethylene group, a tetramethylene group, a pentamethylene group, a hexamethylene group, a heptamethylene group, an octamethylene group, a decamethylene group, a dodecamethylene group, and a 2,2,4-trimethylhexane-1,6-diyl group; alkenediyl groups such as a pentan-2-ene-1,5-diyl group; and the like. If the hydrocarbylene group that can form $R^1$ and $R^2$ contains a nitrogen atom and/or an oxygen atom, examples of the hydrocarbylene group containing a nitrogen atom and/or an oxygen atom include a group represented by —CH=N—CH=CH—, a group represented by —CH=N—CH$_2$—CH$_2$—, a group represented by —CH$_2$—CH$_2$—O—CH$_2$—CH$_2$—, and the like.

Preferably, $R^1$ and $R^2$ are an alkyl group or are bonded to each other to form an alkylene group. $R^1$ and $R^2$ are more preferably an alkyl group. $R^1$ and $R^2$ are still more preferably a methyl group or an ethyl group.

In General Formula (2), if $R^1$ and $R^2$ are hydrocarbyl groups, specific examples of the group represented by General Formula (2) include dialkylamino groups such as a dimethylamino group, a diethylamino group, an ethylmethylamino group, a di-n-propylamino group, a diisopropylamino group, a di-n-butylamino group, a diisobutylamino group, a di-sec-butylamino group, and a di-tert-butylamino group; diarylamino groups such as a diphenylamino group; and the like. Among these, the dialkylamino groups are preferred, and the dimethylamino group, the diethylamino group, and the di-n-butylamino group are more preferred.

In General Formula (2), if $R^1$ and $R^2$ each are a hydrocarbyl group having a hydrocarbyloxy group as a substituent, specific examples of the group represented by General Formula (2) include di(alkoxyalkyl)amino groups such as a di(methoxymethyl)amino group and a di(ethoxymethyl)amino group, and the like.

If $R^1$ and $R^2$ in General Formula (2) are trihydrocarbylsilyl groups, specific examples of the group represented by General Formula (2) include trialkylsilyl group-containing amino groups such as a bis(trimethylsilyl)amino group, a bis(tert-butyldimethylsilyl)amino group, and a N-trimethylsilyl-N-methylamino group, and the like.

If $R^1$ and $R^2$ in General Formula (2) are bonded to each other to form a hydrocarbylene group, specific examples of the group represented by General Formula (2) include 1-alkyleneimino groups such as a 1-trimethyleneimino group, a 1-pyrrolidino group, a 1-piperidino group, a 1-hexamethyleneimino group, a 1-heptamethyleneimino group, a 1-octamethyleneimino group, a 1-decamethyleneimino group, and a 1-dodecamethyleneimino group, and the like.

If $R^1$ and $R^2$ in General Formula (2) are bonded to each other to form a hydrocarbylene group containing a nitrogen atom and/or an oxygen atom, specific examples of the group represented by General Formula (2) include a 1-imidazolyl group, a 4,5-dihydro-1-imidazolyl group, a morpholino group, and the like.

The group represented by General Formula (2) is preferably a dialkylamino group and a 1-alkyleneimino group. More preferred are dialkylamino groups, and still more preferred are a dimethylamino group, a diethylamino group, and a di-n-butylamino group.

Examples of the hydrocarbyloxy group that can form $X^2$, $X^3$, and $X^4$ in General Formula (1) include alkoxy groups such as a methoxy group, an ethoxy group, a n-propoxy group, an isopropoxy group, a n-butoxy group, a sec-butoxy group, and a tert-butoxy group; aryloxy groups such as a phenoxy and a benzyloxy group; and the like.

Examples of the hydrocarbyl group that can form $X^2$, $X^3$, and $X^4$ in General Formula (1) include alkyl groups such as a methyl group, an ethyl group, a n-propyl group, an isopropyl group, a n-butyl group, a sec-butyl group, and a tert-butyl group; aryl groups such as a phenyl group, a 4-methyl-1-phenyl group, and a benzyl group; and the like.

If the hydrocarbyl group that can form $X^2$, $X^3$, and $X^4$ has a substituent, examples thereof include hydrocarbyl groups having a hydrocarbyloxy group as a substituent. Examples thereof include alkoxyalkyl groups such as a methoxymethyl group, an ethoxymethyl group, and an ethoxyethyl group, and the like.

If in General Formula (1), $X^1$ is a chemical single bond and one of $X^2$, $X^3$, and $X^4$ is a substituted amino group, specific examples of the vinyl compound containing a silicon atom-containing functional group represented by General Formula (1) include (dialkylamino)dialkylvinylsilanes such as (dimethylamino)dimethylvinylsilane, (ethylmethylamino)dimethylvinylsilane, (di-n-propylamino)dimethylvinylsilane, (diisopropylamino)dimethylvinylsilane, (dimethylamino)diethylvinylsilane, (ethylmethylamino)diethylvinylsilane, (di-n-propylamino)diethylvinylsilane, and (diisopropylamino)diethylvinylsilane; [bis(trialkylsilyl)amino]dialkylvinylsilanes such as [bis(trimethylsilyl)amino]dimethylvinylsilane, [bis(t-butyldimethylsilyl)amino]dimethylvinylsilane, [bis(trimethylsilyl)amino]diethylvinylsilane, and [bis(t-butyldimethylsilyl)amino]diethylvinylsilane; (dialkylamino)di(alkoxy alkyl)vinylsilanes such as (dimethylamino)di(methoxymethyl)vinylsilane, (dimethylamino)di(methoxyethyl)vinylsilane, (dimethylamino)di(ethoxymethyl)vinylsilane, (dimethylamino)di(ethoxyethyl)vinylsilane, (diethylamino)di(methoxymethyl)vinylsilane, (diethylamino)di(methoxyethyl)vinylsilane, (diethylamino)di(ethoxymethyl)vinylsilane, and (diethylamino)di(ethoxyethyl)vinylsilane; cyclic aminodialkylvinylsilane compounds such as pyrrolidinodimethylvinylsilane, piperidinodimethylvinylsilane, hexamethyleneiminodimethylvinylsilane, 4,5-dihydroimidazolyldimethylvinylsilane, and moipholinodimethylvinylsilane; and the like.

If in General Formula (1), $X^1$ is a hydrocarbylene group and one of $X^2$, $X^3$, and $X^4$ is a substituted amino group, specific examples of the vinyl compound containing a silicon atom-containing functional group represented by General Formula (1) include (dialkylamino)dialkylvinylphenylsilanes such as (dimethylamino)dimethyl-4-vinylphenylsilane, (dimethylamino)dimethyl-3-vinylphenylsilane, (diethylamino)dimethyl-4-vinylphenylsilane, (diethylamino)dimethyl-3-vinylphenylsilane, (di-n-propylamino)dimethyl-4-vinylphenylsilane, (di-n-propylamino)dimethyl-3-vinylphenylsilane, (di-n-butylamino)dimethyl-4-vinylphenylsilane, (di-n-butylamino)dimethyl-3-vinylphenylsilane, (dimethylamino)diethyl-4-vinylphenylsilane, (dimethylamino)diethyl-3-vinylphenylsilane, (diethylamino)diethyl-4-vinylphenylsilane, (diethylamino)diethyl-3-vinylphenylsilane, (di-n-propylamino)diethyl-4-vinylphenylsilane, (di-n-propylamino)diethyl-3-vinylphenylsilane, (di-n-butylamino)diethyl-4-vinylphenylsilane, and (di-n-butylamino)diethyl-3-vinylphenylsilane, and the like.

If in General Formula (1), $X^1$ is a chemical single bond and two of $X^2$, $X^3$, and $X^4$ are substituted amino groups, specific examples of the vinyl compound containing a silicon atom-containing functional group represented by General Formula (1) include bis(dialkylamino)alkylvinylsilanes such as bis(dimethylamino)methylvinylsilane, bis(diethylamino)methylvinylsilane, bis(di-n-propylamino)methylvinylsilane, bis(di-n-butylamino)methylvinylsilane, bis(dimethylamino)ethylvinylsilane, bis(diethylamino)ethylvinylsilane, bis(di-n-propylamino)ethylvinylsilane, and bis(di-n-butylamino)ethylvinylsilane; bis[bis(trialkylsilyl)amino]alkylvinylsilanes such as bis[bis(trimethylsilyl)amino]methylvinylsilane, bis[bis(tert-butyldimethylsilyl)amino]methylvinylsilane, bis[bis(trimethylsilyl)amino]ethylvinylsilane, and bis[bis(tert-butyldimethylsilyl)amino]ethylvinylsilane; bis(dialkylamino)alkoxyalkylsilanes such as bis(dimethylamino)methoxymethylvinylsilane, bis(dimethylamino)methoxyethylvinylsilane, bis(dimethylamino)ethoxymethylvinylsilane, bis(dimethylamino)ethoxyethylvinylsilane, bis(diethylamino)methoxymethylvinylsilane, bis(diethylamino)methoxyethylvinylsilane, bis(diethylamino)ethoxymethylvinylsilane, and bis(dimethylamino)ethoxyethylvinylsilane; bis(cyclic amino)alkylvinylsilane compounds such as bis(pyrrolidino)methylvinylsilane, bis(piperidino)methylvinylsilane, bis(hexamethyleneimino)methylvinylsilane, bis(4,5-dihydroimidazolyl)methylvinylsilane, and bis(morpholino)methylvinylsilane; and the like.

If in General Formula (1), $X^1$ is a hydrocarbylene group and two of $X^2$, $X^3$, and $X^4$ are substituted amino groups, specific examples of the vinyl compound containing a silicon atom-containing functional group represented by General Formula (1) include bis(dialkylamino)alkylvinylphenylsilanes such as bis(dimethylamino)methyl-4-vinylphenylsilane, bis(dimethylamino)methyl-3-vinylphenylsilane, bis(diethylamino)methyl-4-vinylphenylsilane, bis(diethylamino)methyl-3-vinylphenylsilane, bis(di-n-propylamino)methyl-4-vinylphenylsilane, bis(di-n-propylamino)methyl-3-vinylphenylsilane, bis(di-n-butylamino)methyl-4-vinylphenylsilane, bis(di-n-butylamino)methyl-3-vinylphenylsilane, bis(dimethylamino)ethyl-4-vinylphenylsilane, bis(dimethylamino)ethyl-3-vinylphenylsilane, bis(diethylamino)ethyl-4-vinylphenylsilane, bis(diethylamino)ethyl-3-vinylphenylsilane, bis(di-n-propylamino)ethyl-4-vinylphenylsilane, bis(di-n-propylamino)ethyl-3-vinylphenylsilane, bis(di-n-butylamino)ethyl-4-vinylphenylsilane, and bis(di-n-butylamino)ethyl-3-vinylphenylsilane, and the like.

If in General Formula (1), $X^1$ is a chemical single bond and three of $X^2$, $X^3$, and $X^4$ are substituted amino groups, specific examples of the vinyl compound containing a silicon atom-containing functional group represented by General Formula (1) include tris(dialkylamino)vinylsilanes such as tris(dimethylamino)vinylsilane, tris(diethylamino)vinylsilane, tris(di-n-propylamino)vinylsilane, and tris(di-n-butylamino)vinylsilane, and the like.

If in General Formula (1), $X^1$ is a hydrocarbylene group and three of $X^2$, $X^3$, and $X^4$ are substituted amino groups, specific examples of the vinyl compound containing a silicon atom-containing functional group represented by General Formula (1) include tris(dialkylamino)vinylphenylsilanes such as tris(dimethylamino)-4-vinylphenylsilane, tris(dimethylamino)-3-vinylphenylsilane, tris(diethylamino)-4- vinylphenylsilane, tris(diethylamino)-3-vinylphenylsilane, tris(di-n-propylamino)-4-vinylphenylsilane, tris(di-n-propylamino)-3-vinylphenylsilane, tris(di-n-butylamino)-4-vinylphenylsilane, and tris(di-n-butylamino)-3-vinylphenylsilane, and the like.

If in General Formula (1), $X^1$ is a chemical single bond and none of $X^2$, $X^3$, and $X^4$ is a substituted amino group, specific examples of the vinyl compound containing a silicon atom-containing functional group represented by General Formula (1) include trialkoxyvinylsilanes such as trimethoxyvinylsilane, triethoxyvinylsilane, and tripropoxyvinylsilane; dialkoxyalkylvinylsilanes such as methyldimethoxyvinylsilane and methyldiethoxyvinylsilane; dialkoxyarylvinylsilanes such as di(tert-pentoxy)phenylvinylsilane and di(tert-butoxy)phenylvinylsilane; monoalkoxydialkylvinylsilanes such as dimethylmethoxyvinylsilane;

monoalkoxydiarylvinylsilanes such as tert-butoxydiphenylvinylsilane and tert-pentoxydiphenylvinylsilane; monoalkoxyalkylarylvinylsilanes such as tert-butoxymethylphenylvinylsilane and tert-butoxyethylphenylvinylsilane; substituted alkoxyvinylsilane compounds such as tris(β-methoxyethoxy)vinylsilane; and the like.

Among these compounds represented by General Formula (1), preferred are those where $X^1$ is a chemical single bond, and more preferred are those where $X^1$ is a chemical single bond and two of $X^2$, $X^3$, and $X^4$ are substituted amino groups. Particularly preferred are those where $X^1$ is a chemical single bond and two of $X^2$, $X^3$, and $X^4$ are dialkylamino groups.

Among these compounds represented by General Formula (1), preferred are bis(dimethylamino)methylvinylsilane, bis(diethylamino)methylvinylsilane, and bis(di-n-butylamino)methylvinylsilane, and particularly preferred is bis(diethylamino)methylvinylsilane.

Examples of the vinyl compound having a functional group interactive with silica other than the compound represented by General Formula (1) include bis(trialkylsilyl)aminostyrenes such as 4-N,N-bis(trimethylsilyl)aminostyrene and 3-N,N-bis(trimethylsilyl)aminostyrene; bis(trialkylsilyl)aminoalkylstyrenes such as 4-bis(trimethylsilyl)aminomethylstyrene, 3-bis(trimethylsilyl)aminomethylstyrene, 4-bis(trimethylsilyl)aminoethylstyrene, and 3-bis(trimethylsilyl)aminoethylstyrene; pyrrolidinoethylstyrene; and the like. Among these, pyrrolidinoethylstyrene is preferred. The pyrrolidinoethylstyrene may be in any of the ortho, meta, and para forms. The meta form and the para form are preferred, and a mixture of the meta form and the para form is more preferred.

If the compound represented by General Formula (1) is used as the vinyl compound having a functional group interactive with silica, the unit of the vinyl compound having a functional group interactive with silica to be introduced into the conjugated diene-based rubber according to the present invention are represented by General Formula (3):

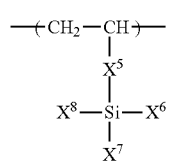

(3)

where $X^5$ represents a chemical single bond or a hydrocarbylene group, and $X^6$, $X^7$ and $X^8$ each independently represent a hydroxyl group, a substituted amino group, a hydrocarbyloxy group, or an optionally substituted hydrocarbyl group.

In the unit represented by General Formula (3), $X^5$ corresponds to $X^1$ in the compound represented by General Formula (1), and $X^6$, $X^7$, and $X^8$ correspond to $X^2$, $X^3$, and $X^4$ in the compound represented by General Formula (1), respectively. For this reason, $X^5$, $X^6$, $X^7$, and $X^8$ in the unit represented by General Formula (3) may be the same as $X^1$, $X^2$, $X^3$, and $X^4$ in the compound represented by General Formula (1). If a compound represented by General Formula (1) where at least one of $X^2$, $X^3$, and $X^4$ is a substituted amino group or a hydrocarbyloxy group is used, at least one of $X^2$, $X^3$, and $X^4$ can be converted into a hydroxyl group as a result of hydrolysis of the substituted amino group or the hydrocarbyloxy group at any timing in any step.

The proportion of the unit of the vinyl compound having a functional group interactive with silica contained in the polymer block (A) is not particularly limited, and is preferably adjusted in the range of preferably 0.01 to 20 wt %, more preferably 0.02 to 2 wt %, particularly preferably 0.05 to 1 wt % of the total monomer units forming the conjugated diene-based rubber. Control of the proportion of the unit of the vinyl compound having a functional group interactive with silica within this range results in a more remarkable effect of reducing adhesion to rolls and a more remarkable effect of reducing the heat buildup and improving the operation stability.

The polymer block (A) may also contain different monomer unit other than the isoprene monomer unit, the aromatic vinyl monomer unit, and the unit of the vinyl compound having a functional group interactive with silica. Examples of other compounds forming such different monomer unit include linear olefin compounds such as ethylene, propylene, and 1-butene; cyclic olefin compounds such as cyclopentene and 2-norbornene; conjugated diene compounds other than isoprene, such as 1,3-butadiene, 2,3-dimethyl-1,3-butadiene, 2-chloro-1,3-butadiene, 1,3-pentadiene, and 1,3-hexadiene; non-conjugated diene compounds such as 1,5-hexadiene, 1,6-heptadiene, 1,7-octadiene, dicyclopentadiene, and 5-ethylidene-2-norbornene; and the like. The proportion of the different monomer unit contained in the polymer block (A) is preferably 20 wt % or less, more preferably 10 wt % or less, still more preferably 6 wt % or less.

The polymer block (A) has a weight average molecular weight (Mw) in the range of 1,000 to 30,000, preferably 1,500 to 20,000, more preferably 2,000 to 10,000. If the polymer block (A) has an excessively small weight average molecular weight (Mw), the effect of reducing adhesion to rolls and the effect of reducing the heat buildup and improving the operation stability are not provided. In contrast, if the polymer block (A) has an excessively large weight average molecular weight (Mw), a cross-linked rubber having undesirably increased heat buildup is obtained.

The polymer block (A) has a molecular weight distribution of preferably 1.0 to 1.5, more preferably 1.0 to 1.3, where the molecular weight distribution is represented as the ratio (Mw/Mn) of the weight average molecular weight (Mw) to the number average molecular weight (Mn). A molecular weight distribution (Mw/Mn) of the polymer block (A) within this range further facilitates the production of the conjugated diene-based rubber. The weight average molecular weight (Mw) and the number average molecular weight (Mn) of the polymer block (A) can be determined by gel permeation chromatography against polystyrene standards.

The polymer block (B) may be any polymer block containing 1,3-butadiene monomer unit as the main component. The polymer block (B) may consist of only the 1,3-butadiene monomer unit, or may consist of the 1,3-butadiene monomer unit and monomer unit other than the 1,3-butadiene monomer unit. In this case, suitable examples of the monomer unit other than the 1,3-butadiene monomer unit include aromatic vinyl monomer unit. The polymer block (B) according to the present invention preferably contains aromatic vinyl monomer unit in addition to the 1,3-butadiene monomer unit.

The proportion of the 1,3-butadiene monomer unit contained in the polymer block (B) is preferably 50 wt % or more, more preferably 55 to 95 wt %, still more preferably 60 to 90 weight. Control of the proportion of the 1,3-butadiene monomer unit contained in the polymer block (B) within this range further facilitates the production of the conjugated diene-based rubber.

Usable aromatic vinyl compounds for forming the aromatic vinyl monomer unit are those exemplified in the description of the polymer block (A) above. Among these aromatic vinyl compounds above, styrene is preferred. The proportion of the aromatic vinyl monomer unit is preferably 50 wt % or less, more preferably 5 to 45 wt %, still more preferably 10 to 40 wt %.

In the conjugated diene-based rubber according to the present invention, at least one of the polymer block (A) and the polymer block (B) above contains the unit of the vinyl compound having a functional group interactive with silica. The conjugated diene-based rubber according to the present invention may be that according to an aspect in which the unit of such a vinyl compound having a functional group interactive with silica are contained only in the polymer block (A), may be that according to an aspect in which the unit of such a vinyl compound having a functional group interactive with silica are contained only in the polymer block (B), or may be that according to an aspect in which the unit of such a vinyl compound having a functional group interactive with silica are contained in both of the polymer block (A) and the polymer block (B).

Vinyl compounds having a functional group interactive with silica which can be used to form the unit of the vinyl compound having a functional group interactive with silica are those exemplified in the description of the polymer block (A) above, and those vinyl compounds listed as preferred examples in the description of the polymer block (A) above can be suitably used.

The proportion of the unit of the vinyl compound having a functional group interactive with silica contained in the polymer block (B) is not particularly limited, and is preferably adjusted in the range of preferably 0.01 to 20 wt %, more preferably 0.02 to 2 wt %, particularly preferably 0.05 to 1 wt % of the total monomer units forming the conjugated diene-based rubber.

The polymer block (B) may contain different monomer unit other than the 1,3-butadiene monomer unit, the aromatic vinyl monomer unit, and the unit of the vinyl compound having a functional group interactive with silica. Usable other compounds for forming such different monomer unit include isoprene in addition to the compounds exemplified in the description of the polymer block (A) (excluding 1,3-butadiene). The proportion of the different monomer unit contained in the polymer block (B) is preferably 40 wt % or less, more preferably 35 wt % or less, still more preferably 25 wt % or less.

The proportion of the 1,3-butadiene monomer unit contained in the conjugated diene-based rubber according to the present invention is not particularly limited, and it is sufficient that the proportion is controlled such that the proportion of the unit of the vinyl compound having a functional group interactive with silica falls within the range above. The proportion is preferably 50 to 99.99 wt %, more preferably 55 to 94.98 wt %, still more preferably 60 to 89.95 wt % of the total monomer units forming conjugated diene-based rubber. The proportion of the aromatic vinyl monomer unit contained in the entire conjugated diene-based rubber according to the present invention is also not particularly limited, and it is sufficient that the proportion is controlled such that the proportion of the unit of the vinyl compound having a functional group interactive with silica falls within the range above. The proportion is preferably 49.99 wt % or less, more preferably 5 to 44.98 wt %, still more preferably 10 to 39.95 wt % of the total monomer units forming the conjugated diene-based rubber.

The entire conjugated diene-based rubber according to the present invention has a weight average molecular weight (Mw) in the range of 50,000 to 5,000,000, preferably 75,000 to 3,000,000, more preferably 100,000 to 1,000,000. Control of the weight average molecular weight of the entire conjugated diene-based rubber within this range facilitates compounding of silica with a rubber composition containing such a conjugated diene-based rubber, and results in a rubber composition having further enhanced processability and thus a cross-linked rubber having further reduced heat buildup.

The entire conjugated diene-based rubber according to the present invention has a molecular weight distribution of preferably 1.1 to 3.0, more preferably 1.2 to 2.5, particularly preferably 1.2 to 2.2, where the molecular weight distribution is represented as the ratio (Mw/Mn) of the weight average molecular weight (Mw) to the number average molecular weight (Mn). By controlling the molecular weight distribution (Mw/Mn) of the entire conjugated diene-based rubber within this range, a cross-linked rubber having further reduced heat buildup can be obtained. The weight average molecular weight (Mw) and the weight average molecular weight (Mw) of the entire conjugated diene-based rubber can be determined by gel permeation chromatography against polystyrene standards.

In the entire conjugated diene-based rubber according to the present invention, the vinyl bond content in the conjugated diene monomer unit (such as isoprene monomer unit and 1,3-butadiene monomer unit) is preferably 1 to 90 wt %, more preferably 3 to 85 wt %, particularly preferably 5 to 80 wt %. By controlling the vinyl bond content in the conjugated diene monomer unit in the entire conjugated diene-based rubber within this range, a cross-linked rubber having further reduced heat buildup can be obtained.

The conjugated diene-based rubber according to the present invention has a Mooney viscosity ($ML_{1+4}$, 100° C.) of preferably 20 to 100, more preferably 30 to 90, particularly preferably 35 to 80. Note that if the conjugated diene-based rubber is an oil extended rubber, the oil extended rubber preferably has a Mooney viscosity within this range.

Although the conjugated diene-based rubber according to the present invention has any glass transition temperature (Tg), the glass transition temperature is preferably 20 to −110° C., more preferably 10 to −70° C. The glass transition temperature of the conjugated diene-based rubber used in the present invention can be appropriately adjusted, for example, by controlling the aromatic vinyl monomer unit content and the vinyl bond content in the conjugated diene monomer unit in the conjugated diene-based rubber.

The conjugated diene-based rubber according to the present invention can be produced, for example, through a step of polymerizing a monomer (a) containing isoprene in an inert solvent in the presence of a polymerization initiator to form the polymer block (A) having an active terminal; and a step of mixing and continuously polymerizing the polymer block (A) having an active terminal with a monomer (b) including 1,3-butadiene to yield a conjugated diene-based polymer chain including the polymer block (A) and the polymer block (B) and having an active terminal.

The monomer (a) for forming the polymer block (A) can include any monomers as long as isoprene is included, and monomers corresponding to the monomer composition for the polymer block (A) to be prepared (the above-mentioned monomer composition) may be used. For example, if the polymer block (A) consists of the isoprene monomer unit and the aromatic vinyl monomer unit, it is sufficient that the monomer (a) includes isoprene and an aromatic vinyl compound. If the polymer block (A) contains the unit of the vinyl compound having a functional group interactive with silica in addition to the isoprene monomer unit and the aromatic vinyl monomer unit, it is sufficient that the monomer (a) includes the vinyl compound having a functional group interactive with silica in addition to isoprene and the aromatic vinyl compound.

The inert solvent used in polymerization of the monomer (a) including isoprene, which is used for formation of the polymer block (A), may be any inert solvent that is usually used in solution polymerization and does not inhibit the polymerization reaction. Specific examples of the inert solvent include linear or branched aliphatic hydrocarbons such as propane, n-butane, isobutane, n-pentane, isopentane, n-hexane, propene, 1-butene, isobutene, trans-2-butene, cis-2-butene, 1-pentene, 2-pentene, 1-hexene, 2-hexene, and n-heptane; alicyclic hydrocarbons such as cyclopentane and cyclohexane; aromatic hydrocarbons such as benzene, ethylbenzene, toluene, and xylene; ether compounds such as tetrahydrofuran and diethyl ether; and the like. These inert solvents may be used alone or in combination. Although not particularly limited, the amount of the inert solvent is chosen to provide a monomer concentration of, for example, 1 to 80 wt %, preferably 5 to 50 wt %.

The polymerization initiator used for formation of the polymer block (A) can be any polymerization initiator that enables polymerization of the monomer (a) including isoprene to yield polymer chains having active terminals. Specific examples thereof include polymerization initiators containing organic alkali metal compounds, organic alkaline earth metal compounds, and lanthanide-series metal compounds as the primary catalyst, and the like. Examples of the organic alkali metal compounds include organic monolithium compounds such as n-butyllithium, sec-butyllithium, t-butyllithium, hexyllithium, phenyllithium, ethyllithium, n-propyllithium, isopropyllithium, tert-octyllithium, n-decyllithium, 2-naphthyllithium, 2-butylphenyllithium, 4-phenylbutyllithium, hexyllithium, cyclopentyllithium, the reaction product of diisopropenylbenzene with butyllithium, and stilbenelithium; organic polyvalent lithium compounds such as dilithiomethane, 1,4-dilithiobutane, 1,4-dilithio-2-ethylcyclohexane, 1,3,5-trilithiobenzene, 1,3,5-tris(lithiomethyl)benzene, the reaction product of sec-butyllithium with diisopropenylbenzene, the reaction product of n-butyllithium with 1,3-butadiene and divinylbenzene, and reaction products of n-butyllithium with polyacetylene compounds; organic sodium compounds such as sodium naphthalene; organic potassium compounds such as potassium naphthalene; organic rubidium compounds; organic cesium compounds; and the like. Besides, examples thereof include alkoxides, sulfonates, carbonates, and amides of lithium, sodium, and potassium, and the like. These may also be used in combination with other organic metal compounds. Furthermore, known organic alkali metal compounds disclosed in U.S. Pat. No. 5,708,092, British Patent No. 2,241,239, U.S. Pat. No. 5,527,753, and the like can also be used.

Examples of the organic alkaline earth metal compounds include di-n-butylmagnesium, di-n-hexylmagnesium, diethoxycalcium, calcium distearate, di-t-butoxystrontium, diethoxybarium, diisopropoxybarium, diethylmercaptobarium, di-t-butoxybarium, diphenoxybarium, diethylaminobarium, barium distearate, diethylbarium, and the like. Examples of the polymerization initiators containing lanthanide-series metal compounds as the primary catalyst include polymerization initiators comprising salts of lanthanide-series metals (such as salts of carboxylic acids and phosphorus-containing organic acids with lanthanide-series metals such as lanthanum, cerium, praseodymium, neodymium, samarium, and gadolinium) as the primary catalyst, and cocatalysts such as alkylaluminum compounds, organic aluminum hydride compounds, and organic aluminum halide compounds; and the like. Among these polymerization initiators, the organic monolithium compounds and the organic polyvalent lithium compounds are preferably used, and the organic monolithium compounds are more preferably used. From the viewpoint of industrial availability and readiness in control of the polymerization reaction, n-butyllithium is particularly preferably used. The organic alkali metal compounds may be preliminarily reacted with secondary amines such as dibutylamine, dihexylamine, dibenzylamine, pyrrolidine, piperidine, hexamethyleneimine, and heptamethyleneimine, and may be used in the form of an organic alkali metal amide compound. These polymerization initiators may be used alone or in combination. Examples of the organic alkali metal amide compounds include, but should not be limited to, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium-N-methylpiperadide, lithium ethylpropylamide, lithium ethylbutylamide, lithium ethylbenzylamide, lithium methylphenethylamide, and the like.

Although the amount of the polymerization initiator to be used is determined according to the target molecular weight, the amount is preferably in the range of 4 to 250 mmol, more preferably 6 to 200 mmol, particularly preferably 10 to 70 mmol relative to 100 g of the monomer (a) including isoprene.

The polymerization temperature during polymerization of the monomer (a) including isoprene is in the range of preferably −80 to +150° C., more preferably 0 to 100° C., still more preferably 20 to 90° C. The polymerization can be performed in any manner, that is, in batch or continuously. Examples of the bonding sequence when the polymer block (A) is incorporated into copolymer chains include a variety of bonding sequences such as a block sequence, a tapered sequence, and a random sequence.

In the polymerization of the monomer (a), a polar compound is preferably added to the inert solvent to adjust the vinyl bond content in the isoprene monomer unit in the polymer block (A). Examples of the polar compound include ether compounds such as dibutyl ether, tetrahydrofuran, and 2,2-di(tetrahydrofuryl)propane; tertiary amines such as tetramethylethylenediamine; alkali metal alkoxides; phosphine compounds; and the like. Among these, preferred are ether compounds and tertiary amines, more preferred are tertiary amines, and particularly preferred is tetramethylethylenediamine. These polar compounds may be used alone or in combination. The amount of the polar compound to be used is determined according to the target vinyl bond content, and is preferably 0.01 to 30 mol, more preferably 0.05 to 10 mol relative to 1 mol of the polymerization initiator. The amount of the polar compound within this range facilitates the control of the vinyl bond content in the isoprene monomer unit, and prevents failures caused by deactivation of the polymerization initiator. The vinyl bond content in the isoprene monomer unit can be increased by increasing the amount of the polar compound to be used within this range.

The vinyl bond content in the isoprene monomer unit in the polymer block (A) is preferably 3 to 90 wt %, more preferably 5 to 80 wt %. By controlling the vinyl bond content in the isoprene monomer unit within this range, the heat buildup of the resulting cross-linked rubber can be further reduced. In this specification, the vinyl bond content in the isoprene monomer unit indicates the proportion of the total amount of isoprene monomer unit having the 1,2-structure and those having the 3,4-structure in the isoprene monomer unit.

In the next step, by mixing and continuously polymerizing the polymer block (A) having an active terminal, which is prepared through polymerization of the monomer (a) including isoprene, and the monomer (b) including 1,3-butadiene, the polymer block (B) can be famed subsequently to the formation of the polymer block (A), thereby yielding a conjugated diene-based polymer chain including the polymer block (A) and the polymer block (B) and having an active terminal. The famed polymer block (B) has the active terminal while the active terminal of the polymer block (A) is consumed.

The monomer (b) for forming the polymer block (B) may be any monomer as long as 1,3-butadiene is included, and monomers corresponding to the monomer composition for the polymer block (B) to be prepared (the above-mentioned monomer composition) may be used. For example, if the polymer block (B) consists of the 1,3-butadiene monomer unit and the aromatic vinyl monomer unit, it is sufficient that the monomer (b) includes 1,3-butadiene and an aromatic vinyl compound. If the polymer block (B) contains the unit of the vinyl compound having a functional group interactive with silica in addition to the 1,3-butadiene monomer unit and the aromatic vinyl monomer unit, it is sufficient that the monomer (b) includes the vinyl compound having a functional group interactive with silica in addition to 1,3-butadiene and the aromatic vinyl compound.

In the conjugated diene-based rubber according to the present invention, at least one of the polymer block (A) described above and the polymer block (B) contains the unit of the vinyl compound having a functional group interactive with silica. For this reason, in this production method, it is sufficient that the vinyl compound having a functional group interactive with silica is included in at least one of the monomer (a) including isoprene used for formation of the polymer block (A) and the monomer (b) including 1,3-butadiene used for formation of the polymer block (B).

The inert solvent used in polymerization of the monomer (b) including 1,3-butadiene for formation of the polymer block (B) can be any inert solvent, and the same inert solvents as those described above can be used.

The amount of the polymer block (A) having an active terminal to be used during the formation of the polymer block (B) is determined according to the target molecular weight, and is in the range of preferably 0.1 to 5 mmol, more preferably 0.15 to 2 mmol, still more preferably 0.2 to 1.5 mmol relative to 100 g of the monomer (b) including 1,3-butadiene.

The polymer block (A) can be mixed with the monomer (b) including 1,3-butadiene by any method. The polymer block (A) having an active terminal may be added to a solution of the monomer (b) including 1,3-butadiene, or the monomer (b) including 1,3-butadiene may be added to the solution of the polymer block (A) having an active terminal. From the viewpoint of control of the polymerization, preferred is the method of adding the polymer block (A) having an active terminal to a solution of the monomer (b) including 1,3-butadiene.

The polymerization temperature during the polymerization of the monomer (b) including 1,3-butadiene is in the range of preferably −80 to +150° C., more preferably 0 to 100° C., still more preferably 20 to 90° C. The polymerization can be performed in any manner, that is, in batch or continuously. In order to produce copolymer chains having the polymer block (B), a batch method is preferably used because the randomness of the bonding sequence is readily controlled.

Examples of the bonding sequence of the monomers when copolymer chains having the polymer block (B) are produced include a variety of bonding sequences such as a block sequence, a tapered sequence, and a random sequence. Among these, the random sequence is preferred. The polymer block (B) having a random sequence results in a cross-linked rubber having further reduced heat buildup.

To adjust the vinyl bond content in the 1,3-butadiene monomer unit in the polymer block (B), similarly to the adjustment of the vinyl bond content in the isoprene monomer unit in the polymer block (A), a polar compound is preferably added to the inert solvent during the polymerization. It is noted that the polar compound does not need to be newly added if a sufficient amount of the polar compound to adjust the vinyl bond content in the 1,3-butadiene monomer unit in the polymer block (B) is already added to the inert solvent during the preparation of the polymer block (A). The polar compound used to adjust the vinyl bond content can be the same polar compounds described above. It is sufficient that the amount of the polar compound to be used is determined according to the target vinyl bond content, and is adjusted within the range of preferably 0.01 to 100 mol, more preferably 0.1 to 30 mol relative to 1 mol of the polymerization initiator used in the first polymerization reaction (the first polymerization reaction to form the polymer block (A)). If the amount of the polar compound to be used is in this range, the adjustment of the vinyl bond content in the 1,3-butadiene monomer unit is facilitated, and failures caused by deactivation of the polymerization initiator can be prevented.

The vinyl bond content in the 1,3-butadiene monomer unit in the polymer block (B) is preferably 1 to 90 wt %, more preferably 3 to 85 wt %, particularly preferably 5 to 80 wt %. By controlling the vinyl bond content in the 1,3-butadiene monomer unit in the polymer block (B) within this range, a cross-linked rubber having further reduced heat buildup can be obtained.

Thus, the conjugated diene-based polymer chain including the polymer block (A) and the polymer block (B) and having an active terminal can be obtained. In the present invention, it is preferred from the viewpoint of productivity that the conjugated diene-based polymer chain having an active terminal have a polymer block (A)-polymer block (B) structure and the terminal of the polymer block (B) be the active terminal; however, the conjugated diene-based polymer chain having an active terminal may have a plurality of polymer blocks (A), or may contain other polymer blocks. Examples thereof include conjugated diene-based polymer chains having an active terminal, such as chains having a polymer block (A)-polymer block (B)-polymer block (A) structure, and the like. In this case, the active terminal is famed at the terminal of the polymer block (A) famed following the polymer block (B). When the polymer block (A) is famed on the side of the active terminal of the conjugated diene-based polymer chain, the amount of isoprene to be used is preferably 10 to 100 mol, more preferably 15 to 70 mol, particularly preferably 20 to 35 mol relative to 1 mol of the polymerization initiator used in the first polymerization reaction (the first polymerization reaction to form the polymer block (A)).

In the thus-obtained conjugated diene-based polymer chain including the polymer block (A) and the polymer block (B) and having an active terminal, the active terminal can be deactivated by adding a conventional coupling agent usually used or a polymerization terminator such as an alcohol (e.g. methanol, ethanol, or isopropanol) or water to the polymerization system. Thus, a solution of the conjugated diene-based rubber can be prepared.

An antioxidant such as a phenol-based stabilizer, a phosphorus-based stabilizer, or a sulfur-based stabilizer, a crumb forming agent, a scale inhibitor, and the like are added as needed to the reaction solution of the conjugated diene-based rubber thus obtained, and then the polymerization solvent is separated from the reaction solution by direct drying or steam stripping to recover a solid conjugated diene-based rubber. Furthermore, an extender oil may be added as needed to form the conjugated diene-based rubber into an oil extended rubber. Examples of the extender oil include petroleum-based softening agents such as paraffin-based softening agents, aromatic softening agents, naphthene-based softening agents, plant-based softening agents, fatty acids, and the like. If the petroleum-based softening agent is used, the content of polycyclic aromatic compounds extracted by the method of IP 346 (the test method specified by THE INSTITUTE PETROLEUM of the U.K.) is preferably less than 3%. If the extender oil is used, the amount thereof to be used is usually 5 to 100 parts by weight relative to 100 parts by weight of the conjugated diene-based rubber.

The weight ratio (weight of polymer block (A))/(weight of polymer block (B)) of the polymer block (A) to the polymer block (B) in the conjugated diene-based rubber according to the present invention (the weight ratio in terms of the total weights where more than one polymer blocks (A) and more than one polymer blocks (B) are present) is preferably 0.001 to 0.2, more preferably 0.005 to 0.1, particularly preferably 0.01 to 0.05. By controlling the weight ratio of the polymer block (A) to the polymer block (B) within this range, the resulting cross-linked rubber can have wet grip and heat buildup well balanced.

To enhance the compatibility with silica, the polymer chain terminal of the conjugated diene-based rubber according to the present invention may be modified with a hetero atom-containing functional group. The hetero atom-containing functional group may be any group as long as it has a hetero atom. Preferred are groups containing, as a hetero atom, at least one selected from nitrogen, oxygen, and silicon atoms, and more preferred are groups containing a nitrogen or silicon atom. From the viewpoint of the compatibility with silica, particularly preferred are groups containing a silicon atom.

For example, the hetero atom-containing functional group can be introduced to the polymer chain terminal of the conjugated diene-based rubber by reacting the hetero atom-containing compound with the active terminal of the conjugated diene-based polymer chain including the polymer block (A) and the polymer block (B) and having an active terminal, which is prepared by the production method above.

If the hetero atom-containing functional group is a functional group containing a silicon atom, for example, a siloxane compound can be suitably used as a compound containing a silicon atom. The siloxane compound may be any siloxane compound as long as it has a main chain of siloxane bonds (—Si—O—). Preferred are organosiloxanes having an organic group in the side chain, and more preferred is a polyorganosiloxane represented by General Formula (4):

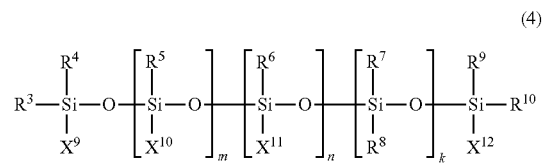

(4)

where $R^3$ to $R^1$ are a $C_1$ to $C_6$ alkyl or $C_6$ to $C_{12}$ aryl group, and these may be the same or different; $X^9$ and $X^{12}$ are any of those selected from the groups consisting of $C_1$ to $C_6$ alkyl groups, $C_6$ to $C_{12}$ aryl groups, $C_1$ to $C_5$ alkoxy groups, and $C_4$ to $C_{12}$ groups having an epoxy group, and these may be the same or different; $X^{10}$ is a $C_1$ to $C_5$ alkoxy group or a $C_4$ to $C_{12}$ group having an epoxy group, and when a plurality of $X^{10}$s is present, these may be the same or different; $X^{11}$ is a group containing 2 to 20 repeating unit of an alkylene glycol, and when a plurality of $X^{11}$s is present, these may be the same or different; m is an integer of 1 to 200; n is an integer of 0 to 200; k is an integer of 0 to 200; and m+n+k is 1 or more.

In the polyorganosiloxane represented by General Formula (4), examples of the $C_1$ to $C_6$ alkyl groups which can foam $R^3$ to $R^{10}$, $X^9$, and $X^{12}$ in General Formula (4) include a methyl group, an ethyl group, a n-propyl group, an isopropyl group, a butyl group, a pentyl group, a hexyl group, a cyclohexyl group, and the like. Examples of the $C_6$ to $C_{12}$ aryl groups include a phenyl group, a methylphenyl group, and the like. Among these, preferred are methyl and ethyl groups from the viewpoint of readiness of the production of the polyorganosiloxane itself.

In the polyorganosiloxane represented by General Formula (4), examples of the $C_1$ to $C_5$ alkoxy groups which can form $X^9$, $X^{10}$ and $X^{12}$ include a methoxy group, an ethoxy group, a propoxy group, an isopropoxy group, a butoxy group, and the like. Among these, preferred are methoxy and ethoxy groups from the viewpoint of readiness of the production of the polyorganosiloxane itself.

Furthermore, in the polyorganosiloxane represented by General Formula (4), examples of the $C_4$ to $C_{12}$ groups having an epoxy group which can form $X^9$, $X^{10}$, and X include groups represented by General Formula (5):

$$-Z^1-Z^1\text{-E}$$ (5)

s where $Z^1$ is a $C_1$ to $C_{10}$ alkylene or alkylarylene group, $Z^2$ is a methylene group, a sulfur atom, or an oxygen atom, and E is a $C_2$ to $C_{10}$ hydrocarbon group having an epoxy group.

The group represented by General Formula (5) is preferably those where $Z^2$ is an oxygen atom, more preferably those where $Z^2$ is an oxygen atom and E is a glycidyl group, particularly preferably those where $Z^1$ is a $C_1$ to $C_3$ alkylene group, $Z^2$ is an oxygen atom, and E is a glycidyl group.

In the polyorganosiloxane represented by General Formula (4), $X^9$ and $X^{12}$ are preferably a $C_4$ to $C_{12}$ group having an epoxy group or a $C_1$ to $C_6$ alkyl group among the groups described above. $X^{10}$ is preferably a $C_4$ to $C_{12}$ group having an epoxy group among the groups described above. Furthermore, it is more preferred that $X^9$ and $X^{12}$ be a $C_1$ to $C_6$ alkyl group and $X^{10}$ be a $C_4$ to $C_{22}$ group having an epoxy group.

In the polyorganosiloxane represented by General Formula (4), $X^{11}$, namely, the group containing 2 to 20 repeating unit of an alkylene glycol is preferably a group represented by General Formula (6):

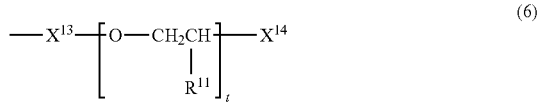

where t is an integer of 2 to 20, $X^{13}$ is a $C_2$ to $C_{10}$ alkylene or alkylarylene group, $R^{11}$ is a hydrogen atom or a methyl group, and $X^{14}$ is a $C_1$ to $C_{10}$ alkoxy or aryloxy group. Among these, preferred groups are those where t is an integer of 2 to 8, $X^{13}$ is a $C_3$ alkylene group, $R^{11}$ is a hydrogen atom, and $X^{14}$ is a methoxy group.

In the polyorganosiloxane represented by General Formula (4), m is an integer of 1 to 200, preferably 20 to 150, more preferably 30 to 120. At m of 1 to 200, the polyorganosiloxane itself represented by General Formula (4) can be more readily produced, and can be more easily handled because the viscosity is not excessively high.

In the polyorganosiloxane represented by General Formula (4), n is an integer of 0 to 200, preferably 0 to 150, more preferably 0 to 120. k is an integer of 0 to 200, preferably 0 to 150, more preferably 0 to 130. The total numeric value of m, n, and k is 1 or more, preferably 3 to 400, more preferably 20 to 300, particularly preferably 30 to 250. If the total numeric value of m, n, and k is 1 or more, the reaction with the conjugated diene-based polymer chain containing the polyorganosiloxane represented by General Formula (4) and having an active terminal readily proceeds. If the total numeric value of m, n, and k is 400 or less, the polyorganosiloxane itself represented by General Formula (4) can be more readily produced, and can be more easily handled because the viscosity is not excessively high.

The compound containing a silicon atom which can be suitably used is a compound represented by General Formula (7) or the vinyl compound containing a silicon-containing functional group represented by General Formula (1).

In General Formula (7), $X^{15}$ to $X^{17}$ each independently are a group represented by —$R^{13}$ or —$OR^{14}$ (where $R^{13}$ and $R^{14}$ are a $C_1$ to $C_6$ alkyl group or a $C_6$ to $C_{12}$ aryl group, preferably a $C_1$ to $C_6$ alkyl group, more preferably a methyl or ethyl group, particularly preferably a methyl group), at least one of $X^{15}$ to $X^{17}$ is a group represented by —$OR^{14}$, and preferably all of $X^{15}$ to $X^{17}$ are a group represented by —$OR^{14}$. $R^{12}$ is a $C_1$ to $C_6$ alkylene group, preferably a $C_2$ to $C_5$ alkylene group, particularly preferably a trimethylene group. $X^{18}$ and $X^{19}$ each independently are a group represented by —$R^{15}$ or —$SiR^{16}R^{17}R^{18}$ (where $R^{15}$, $R^{16}$, $R^{17}$, and $R^{18}$ are a $C_1$ to $C_6$ alkyl or $C_6$ to $C_{12}$ aryl group, and may contain a silicon, nitrogen, or oxygen atom, is preferably a $C_1$ to $C_6$ alkyl group, more preferably a methyl or ethyl group, particularly preferably an ethyl group), and both of $X^{18}$ and $X^{19}$ are preferably a group represented by —$R^{15}$. The silicon atom and the nitrogen atom in General Formula (7) may be directly covalently bonded without $X^{17}$ and $X^{29}$.

Examples of the hetero atom-containing compound other than the compound containing a silicon atom includes compounds containing a nitrogen atom, and such a compound which can be suitably used is a compound represented by General Formula (8):

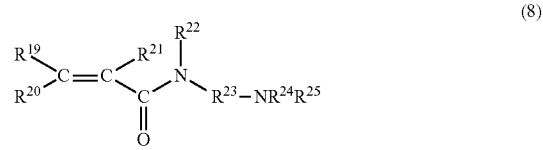

where $R^{29}$ to $R^{22}$ each independently are a hydrogen atom or a $C_1$ to $C_6$ alkyl group, preferably a hydrogen atom; $R^{23}$ is a $C_1$ to $C_6$ alkylene group, preferably a $C_2$ to $C_5$ alkylene group, particularly preferably a trimethylene group; $R^{24}$ and $R^{25}$ each independently are a hydrogen atom or a $C_1$ to $C_6$ alkyl group, preferably a $C_1$ to $C_6$ alkyl group, more preferably a methyl or ethyl group, particularly preferably a methyl group.

Examples of the compound containing a nitrogen atom other than the compound represented by General Formula (8) include urea compounds such as N,N'-dimethylurea, N,N'-diethylurea, N,N,N',N'-tetramethylurea, and N,N-dimethyl-N',N'-diphenylurea; imide compounds such as succinimide, N-methylsuccinimide, maleimide, N-methylmaleimide, phtalimide, and N-methylphtalimide; N-alkyl substituted oxazolidinone compounds such as 1,3-diethyl-2-imidazolidinone, 1,3-dimethyl-2-imidazolidinone, 1,1-dipropyl-2-imidazolidinone, 1-methyl-3-ethyl-2-imidazolidinone, 1-methyl-3-propyl-2-imidazolidinone, 1-methyl-3-butyl-2-imidazolidinone, 1-methyl-3-(2-methoxyethyl)-2-imidazolidinone, 1-methyl-3-(2-ethoxyethyl)-2-imidazolidinone, and 1,3-di-(2-ethoxyethyl)-2-imidazolidinone; pyridyl-substituted ketone compounds and/or pyridyl-substituted vinyl compounds such as methyl-2-pyridyl ketone, methyl-4-pyridyl ketone, propyl-2-pyridyl ketone, di-4-pyridyl ketone, propyl-3-pyridyl ketone, 2-benzoyl pyridine, 2-vinylpyridine, and 4-vinylpyridine; lactam compounds such as 2-pyrrolidone, N-methylpyrrolidone, N-phenylpyrrolidone, 2-piperidone, 2-quinolone, N-methylquinolone, and ε-caprolactam; and the like. Among these, preferred are lactam compounds, and more preferred is N-phenylpyrrolidone because a cross-linked rubber having further reduced heat buildup can be obtained.

Although the conjugated diene-based polymer chain including the polymer block (A) and the polymer block (B) and having an active terminal (hereinafter, appropriately referred to as "conjugated diene-based polymer chain having an active terminal"), which is prepared by the production method above, can be reacted with the hetero atom-containing compound by any method, examples thereof include a method of mixing these materials in a solvent which can dissolve the materials, and the like. The solvents which can be used in this mixing are the inert solvents exemplified as those used in polymerization of the conjugated diene-based polymer chain including the polymer block (A) and the polymer block (B) and having an active terminal. At this time, preferred is a method of adding the hetero atom-containing compound to the polymerization solution used in the polymerization to prepare the conjugated diene-based polymer chain including the polymer block (A) and the polymer block (B) and having an active terminal because of its simplicity. At this time, the hetero atom-containing compound may be dissolved in an inert solvent, and the solution may be added to the polymerization system. Although not particularly limited, the reaction temperature is usually 0 to 120° C. and the reaction time is usually 1 minute to 1 hour.

The amount of the hetero atom-containing compound to be used in the reaction of the conjugated diene-based polymer chain having an active terminal with the hetero atom-containing compound is preferably 0.01 to 10 mol, more preferably 0.1 to 5 mol relative to 1 mol of the polymerization initiator used in the first polymerization reaction (the first polymerization reaction to form the polymer block (A)). The amount of the hetero atom-containing compound to be used within this range results in a cross-linked rubber having further reduced heat buildup. If the siloxane compound such as the polyorganosiloxane represented by General Formula (4) is used as the hetero atom-containing compound, it is preferred that the molar amount in terms of the siloxane structure (—Si—O—) be controlled within the range specified above.

The hetero atom-containing compound can be added to the solution containing the conjugated diene-based polymer chain having an active terminal at any timing. Desirably, the hetero atom-containing compound is added to the solution in the state where the polymerization reaction has not been completed yet and the solution containing the conjugated diene-based polymer chain having an active terminal also contains the monomers, more specifically, in the state where the solution containing the conjugated diene-based polymer chain having an active terminal contains 100 ppm or more, more preferably 300 to 50,000 ppm of the monomers. By adding the hetero atom-containing compound in such a manner, side reactions of the conjugated diene-based polymer chain having an active terminal with impurities contained in the polymerization system can be prevented to control the reaction as intended. If two or more compounds are used as the hetero atom-containing compounds, the timing for the reaction is not particularly limited. In an aspect, these compounds may be added simultaneously and reacted simultaneously, or in another aspect, if two compounds are used as the hetero atom-containing compounds, only one of the two compounds may be preliminarily added to be reacted, and then the other may be added to be reacted. If three or more compounds are used as the hetero atom-containing compounds, these compounds may be added in two or more stages. To obtain a rubber composition having further improved processability, the hetero atom-containing compound may be added to the solution containing the conjugated diene-based polymer chain having an active terminal to be reacted, and then an organic metal compound may be further mixed. Thereby, the resulting rubber composition can have improved processability (the compound Mooney viscosity can be reduced). At this time, after the mixing of the organic metal compound, the hetero atom-containing compound may be further added to be further reacted. Examples of the organic metal compound include organic monolithium compounds such as n-butyllithium, sec-butyllithium, t-butyllithium, hexyllithium, phenyllithium, ethyllithium, n-propyllithium, isopropyllithium, tert-octyllithium, n-decyllithium, 2-naphthyllithium, 2-butylphenyllithium, 4-phenyl butyllithium, hexyllithium, cyclopentyllithium, reaction products of diisopropylbenzene with butyllithium, stilbenelithium, and the like.

By reacting the hetero atom-containing compound with the active terminals of the conjugated diene-based polymer chains having an active terminal, the hetero atom-containing functional group can be bonded to at least part of the terminals of the conjugated diene-based polymer chains. While the conjugated diene-based polymer chains after the reaction have the polymer chain terminals to which the hetero atom-containing functional group is introduced, unmodified conjugated diene-based polymer chains not having the modification with the hetero atom-containing functional group may also be present.

For the conjugated diene-based polymer chain having an active terminal, the hetero atom-containing functional group may be introduced to the terminal of the polymer block (A) by using the polymer chain including the polymer block (A) having an active terminal (such as the polymer chain represented by polymer block (A)-polymer block (B)-polymer block (A)) and reacting the hetero atom-containing compound with the terminal of the polymer block (A), or may be introduced to the terminal of the polymer block (B) by using the polymer chain including the polymer block (B) having an active terminal (such as the polymer chain represented by polymer block (A)-polymer block (B)) and reacting the hetero atom-containing compound with the terminal of the polymer block (B). To obtain a cross-linked rubber having further reduced heat buildup, it is preferred that the hetero atom-containing functional group be introduced to the terminal of the polymer block (B) by reacting the hetero atom-containing compound with the terminal of the polymer block (B).

In the state where the conjugated diene-based polymer chains having an active terminal before the reaction with the hetero atom-containing compound or residual conjugated diene-based polymer chains having an active terminal after the reaction with the hetero atom-containing compound are present, part of the active terminals of the conjugated diene-based polymer chains having an active terminal may be coupled by adding a conventional coupling agent usually used to the polymerization system within the range not inhibiting the effects of the present invention.

Preferably, after the reaction of the hetero atom-containing compound with the conjugated diene-based polymer chains having an active terminal, a polymerization terminator such as an alcohol (e.g., methanol, ethanol, or isopropanol) or water is added to deactivate unreacted active terminals.

After the deactivation of the active terminals of the conjugated diene-based polymer chains, an antioxidant such as a phenol-based stabilizer, a phosphorus-based stabilizer, or a sulfur-based stabilizer, a crumb forming agent, a scale inhibitor, and the like are added to the reaction solution of the conjugated diene-based rubber having a hetero atom-containing functional group at the terminal as needed. Subsequently, the polymerization solvent is separated from the reaction solution by direct drying or steam stripping to recover the conjugated diene-based rubber having a hetero atom-containing functional group at the terminal. The conjugated diene-based rubber may be recovered as an oil extended rubber by mixing an extender oil with the polymerization solution before the separation of the polymerization solvent from the reaction solution. The extender oil which can be used are those listed above.

Rubber Composition

The rubber composition according to the present invention is a composition prepared by adding silica to the rubber ingredient containing the conjugated diene-based rubber according to the present invention.

The rubber composition according to the present invention may contain other rubbers than the conjugated diene-based rubber according to the present invention above. The other rubbers indicate those such as natural rubbers (those may be reformed natural rubbers such as epoxidized natural rubbers (ENR), hydrogenated natural rubbers (HNR), deproteinized natural rubbers (DPNR), high purity natural rubbers (UPNR), grafted natural rubbers, and the like), polyisoprene rubbers, emulsion polymerized styrene-butadiene copolymer rubbers, solution polymerized styrene-butadiene copolymer rubbers, polybutadiene rubbers (those may be high-cis-BR or low-cis-BR, or may be polybutadiene rubbers containing crystal fibers made of a 1,2-polybutadiene polymer), styrene-isoprene copolymer rubbers, butadiene-isoprene copolymer rubbers, styrene-isoprene-butadiene copolymer rubbers, acrylonitrile-butadiene copolymer rubbers, acrylonitrile-styrene-butadiene copolymer rubbers, butyl rubbers (IIR), ethylene-propylene copolymers, chloroprene rubbers, nitrile chloroprene rubbers, and nitrile isoprene rubbers, where the conjugated diene-based rubber is excluded, for example. Among these, preferred are natural rubbers, polyisoprene rubbers, polybutadiene rubbers, and solution polymerized styrene-butadiene copolymer rubbers. These rubbers may be used alone or in combination, for example, as a combination of a natural rubber and a polybutadiene rubber, a natural rubber and a styrene-butadiene copolymer rubber, or the like.

In the rubber composition according to the present invention, the conjugated diene-based rubber according to the present invention occupies preferably 10 to 100 wt %, particularly preferably 50 to 100 wt % of the rubber ingredient in the rubber composition. If the rubber ingredient includes the conjugated diene-based rubber according to the present invention in such a proportion, a cross-linked rubber having excellently low heat buildup and high operation stability can be obtained.

Examples of the silica used in the present invention include dry white carbon, wet white carbon, colloidal silica, sedimented silica, calcium silicate, aluminum silicate, and the like. Among these, preferred is wet white carbon containing hydrous silicic acid as the main component. A carbon-silica dual phase filler comprising carbon black and silica carried on the surface thereof may also be used. These silicas may be used alone or in combination. The nitrogen adsorption specific surface area (measured by the BET method according to ASTM D3037-81) of the silica to be used is preferably 20 to 400 m$^2$/g, more preferably 50 to 220 m$^2$/g, particularly preferably 80 to 170 m$^2$/g. The silica preferably has a pH of 5 to 10.

The silica to be used in the present invention has a dibutyl phthalate (DBP) absorption number in the range of preferably about 100 to about 400, particularly preferably about 150 to about 300.

Although the silica to be used in the present invention preferably has an average limit particle size in the range of 0.01 to 0.05 μm measured with an electronic microscope, the average limit particle size of the silica is not limited to this range and may be smaller or larger than that.

The silica to be used in the present invention can be, for example, a variety of commercially available silicas. Examples thereof include Hi-Sil 210, Hi-Sil 233, and Hi-Sil 243LD available from PPG Industries, Inc.; Zeosil 1115MP, Zeosil 1165MP, and Zeosil 165GR available from Rhodia S.A.; ULTRASIL VN2 and ULTRASIL VN3 available from EVONIK AG; and the like.

The compounding amount of silica in the rubber composition according to the present invention is preferably 10 to 250 parts by weight, more preferably 15 to 150 parts by weight, still more preferably 20 to 130 parts by weight relative to 100 parts by weight of the rubber ingredient in the rubber composition. The compounding amount of silica controlled within this range results in a cross-linked rubber having further reduced heat buildup and enhanced operation stability.

To provide further reduced heat buildup, a silane coupling agent may be further compounded with the rubber composition according to the present invention. The silane coupling agent is not particularly limited, and a variety of silane coupling agents can be used. In the present invention, sulfide-based, mercapto-based, protected mercapto-based (such as those having a carbonylthio group), thiocyanate-based, vinyl-based, amino-based, methacrylate-based, glycidoxy-based, nitro-based, epoxy-based, or chloro-based silane coupling agents can be suitably used. Specific examples of the silane coupling agents include bis(3-(triethoxysilyl) propyl) disulfide, bis(3-triethoxysilylpropyl) trisulfide, bis(3-(triethoxysilyl)propyl)tetrasulfide, γ-mercaptopropyltriethoxysilane, 3-[ethoxy-bis(3,6,9,12,15-pentaoxaoctacosan-1-yloxy)silyl]-1-propanethiol, 3-octanoylthio-1-propyl-triethoxysilane, 3-trimethoxysilylpropyl-N,N-dimethylthiocarbamoyl tetrasulfide, γ-trimethoxysilylpropylbenzothiazyl tetrasulfide, 3-trimethoxysilylpropylbenzothiazole tetrasulfide, 3-thiocyanate propyltriethoxysilane, vinyltriethoxysilane, N-(β-aminoethyl)-γ-aminopropyltrimethoxysilane, 3-trimethoxysilylpropylmethacrylate monosulfide, γ-glycidoxypropyltriethoxysilane, 3-nitropropyltrimethoxysilane, β-(3,4-epoxycyclohexyl)ethyltrimethoxysilane, 3-chloropropyltrimethoxysilane, and the like. NXT-Z100, NXT-Z30, NXT-Z45, NXT-Z60, NXT-Z45, and NXT available from Momentive Performance Materials Inc., Si69, Si75, and VP Si363 available from Evonik Degussa AG, and the like can also be used. These silane coupling agents may be used alone or in combination. One or two or more of these silane coupling agents may be preliminarily foiled into an oligomer, and may be used in the oligomer form. The compounding amount of the silane coupling agent is preferably 0.1 to 30 parts by weight, more preferably 1 to 15 parts by weight relative to 100 parts by weight of silica.

Moreover, carbon blacks such as furnace black, acetylene black, thermal black, channel black, and graphite may be further compounded with the rubber composition according to the present invention. Among these, furnace black is preferred. These carbon blacks may be used alone or in combination. The compounding amount of carbon black is usually 120 parts by weight or less relative to 100 parts by weight of the rubber ingredient in the rubber composition.

Silica can be added to the rubber ingredient containing the conjugated diene-based rubber according to the present invention by any method, and a method of adding and kneading silica to and with a solid rubber material (dry kneading method), a method of adding silica to a solution containing the conjugated diene-based rubber, followed by coagulation and drying (wet kneading method), and the like can be used.

Preferably, the rubber composition according to the present invention further contains a cross-linking agent. Examples of the cross-linking agent include sulfur, sulfur-containing compounds such as halogenated sulfur, organic peroxides, quinone dioximes, organic polyvalent amine compounds, alkylphenol resins having a methylol group, and the like. Among these, sulfur is preferably used. The compounding amount of the cross-linking agent is preferably 0.1 to 15 parts by weight, more preferably 0.5 to 5 parts by weight, particularly preferably 1 to 4 parts by weight relative to 100 parts by weight of the rubber ingredient in the rubber composition.

Furthermore, besides the ingredients above, necessary amounts of compounding agents such as a cross-linking accelerator, a cross-linking activator, an antioxidant, a filler (excluding the silica and carbon black described above), an activating agent, a process oil, a plasticizer, a lubricant, and a tackifier can be compounded with the rubber composition according to the present invention in accordance with ordinary methods.

If sulfur or a sulfur-containing compound is used as the cross-linking agent, use in combination with a cross-linking accelerator and a cross-linking activator is preferred. Examples of the cross-linking accelerator include sulfenamide-based cross-linking accelerators; guanidine-based cross-linking accelerators; thiourea-based cross-linking accelerators; thiazole-based cross-linking accelerators; thiuram-based cross-linking accelerators; dithiocarbamic acid-based cross-linking accelerators; xanthic acid-based cross-linking accelerators; and the like. Among these, preferred are those containing sulfenamide-based cross-linking accelerators. These cross-linking accelerators are used alone or in combination. The compounding amount of the cross-linking accelerator is preferably 0.1 to 15 parts by weight, more preferably 0.5 to 5 parts by weight, particularly preferably 1 to 4 parts by weight relative to 100 parts by weight of the rubber ingredient in the rubber composition.

Examples of the cross-linking activator include higher fatty acids such as stearic acid; zinc oxide; and the like. These cross-linking activators are used alone or in combination. The compounding amount of the cross-linking activator is preferably 0.05 to 20 parts by weight, particularly preferably 0.5 to 15 parts by weight relative to 100 parts by weight of the rubber ingredient in the rubber composition.

To obtain the rubber composition according to the present invention, it is sufficient to knead the ingredients according to an ordinary method. For example, the target composition can be obtained by kneading ingredients excluding thermally unstable ingredients such as the cross-linking agent and the cross-linking accelerator with the conjugated diene-based rubber, and then mixing the thermally unstable ingredients such as the cross-linking agent and the cross-linking accelerator with the kneaded product. The kneading temperature during kneading of the ingredients excluding the thermally unstable ingredients with the conjugated diene-based rubber is preferably 80 to 200° C., more preferably 120 to 180° C., and the kneading time is preferably 30 seconds to 30 minutes. The kneaded product is mixed with the thermally unstable ingredients after it is cooled to usually 100° C. or less, preferably 80° C. or less.

Cross-Linked Rubber

The cross-linked rubber according to the present invention is prepared by cross-linking the above-mentioned rubber composition according to the present invention.

The cross-linked rubber according to the present invention can be produced using the rubber composition according to the present invention, for example, by shaping the rubber composition, for example, with a molding machine, an extruder, an injection molding machine, a press, a roll, or the like having a desired shape, and performing a cross-linking reaction by heating to provide a cross-linked rubber having a fixed shape. In this case, the rubber composition may be preliminarily shaped and then cross-linked, or may be shaped and cross-linked at the same time. The shaping temperature is usually 10 to 200° C., preferably 25 to 120° C. The cross-linking temperature is usually 100 to 200° C., preferably 130 to 190° C., and the cross-linking time is usually 1 minute to 24 hours, preferably 2 minutes to 12 hours, particularly preferably 3 minutes to 6 hours.

Depending on the shape, the size, and the like thereof, the inside of the cross-linked rubber may not be sufficiently cross-linked, even when the surface thereof is cross-linked. For this reason, the cross-linked rubber may be further heated for secondary cross-linking.

As a heating method, a common method used to cross-link rubber such as press heating, steam heating, oven heating, or hot air heating can be appropriately selected.

The cross-linked rubber according to the present invention thus obtained is prepared using the above-mentioned conjugated diene-based rubber according to the present invention, and has excellently low heat buildup and high operation stability. In particular, the conjugated diene-based rubber according to the present invention comprises the polymer block (A) containing the isoprene monomer unit as the main component and having a weight average molecular weight (Mw) in the specific range, and the polymer block (B) containing the 1,3-butadiene monomer unit as the main component, at least one of the polymer blocks containing the unit of the vinyl compound having a functional group interactive with silica, resulting in high compatibility with the filler such as silica due to the nature of the polymer block (A) and the unit of the vinyl compound having a functional group interactive with silica. Thus, the filler such as silica can be well dispersed, and further the reinforcing properties of the filler such as silica can be sufficiently demonstrated. Accordingly, the cross-linked rubber according to the present invention obtained using such a conjugated diene-based rubber according to the present invention has excellently low heat buildup and high operation stability.

Owing to such excellently low heat buildup and high operation stability, the cross-linked rubber according to the present invention can be used in a variety of applications to parts of tires such as cap treads, base treads, carcasses, sidewalls, and bead parts; materials for industrial products such as hoses, belts, mats, and antivibration rubbers; impact resistance improvers for resins; resin film buffer agents; shoe soles; rubber shoes; golf balls; toys; and the like, for example. In particular, because of its excellently low heat buildup and high operation stability, the cross-linked rubber according to the present invention can be suitably used as a material for tires, particularly a material for tires with low energy consumption, and is most suitable for applications to treads.

Examples

Hereinafter, the present invention will be described in more details with reference to Examples, but these Examples should not be construed as limitations to the present invention. Hereinafter, "parts" is on a weight basis unless otherwise specified weight. The tests and the evaluations were performed as follows.

Weight Average Molecular Weight, Molecular Weight Distribution

The weight average molecular weight (Mw) and the molecular weight distribution (Mw/Mn) were determined based on the chart of the molecular weight determined by gel permeation chromatography against polystyrene standards. The measurement by gel permeation chromatography was performed on the following conditions:
Apparatus for measurement: high performance liquid chromatograph (available from Tosoh Corporation, trade name "HLC-8220")
Columns: two columns available from Tosoh Corporation, trade name "GMH-HR-H", which were connected in series.
Detector: differential refractometer
Eluent: tetrahydrofuran
Column temperature: 40° C.

Microstructure

The styrene monomer unit content, the bis(diethylamino) methylvinylsilane monomer unit content, and the vinyl bond content were measured by $^1$H-WR.

Roll Adhesion of Rubber Composition

The prepared rubber composition was shaped into a sheet with a 50° C. open roll mill. The sheet-shaped rubber composition obtained at this time was peeled from the surface of the open roll mill, and the state during the peeling was evaluated according to the following criteria:
A: The rubber composition is easily peeled from the surface of the open roll mill without adhering to the roll. The sheet-shaped rubber composition has a sufficiently smooth surface because there is no adhesion to the roll.
F: The rubber composition is difficult to peel from the surface of the open roll mill with significant adhesion to the roll. The sheet-shaped rubber composition has an inferior surface smoothness because of the significant adhesion to the roll.

Wet Grip of Cross-Linked Rubber

The wet grip was evaluated by measuring the tan δ value at 0° C. of the cross-linked rubber test piece having a length of 50 mm, a width of 12.7 mm, and a thickness of 2 mm using an ARES available from Rheometrics at a dynamic strain of 0.5% and 10 Hz. The tan δ value was shown as an index where the measured value of Comparative Example 3 was 100. A larger index indicates higher wet grip.

Low Heat Buildup of Cross-Linked Rubber

The heat buildup was evaluated by measuring the tan δ value at 60° C. of the cross-linked rubber test piece having a length of 50 mm, a width of 12.7 mm, and a thickness of 2 mm using an ARES available from Rheometrics at a dynamic strain of 0.5% and 10 Hz. In Examples 1 to 9 and Comparative Examples 1 and 2, the tan δ value was shown as an index where the measured value of Comparative Example 3 was 100. In Example 10, it was shown as an index where the measured value of Comparative Example 4 was 100. In Examples 11 and 12 and Comparative Examples 6 and 7, it was shown as an index where the measured value of Comparative Example 5 was 100. A smaller index indicates lower heat buildup.

Operation Stability of Cross-Linked Rubber

According to JIS K6301, the operation stability was evaluated by performing a tensile test on the cross-linked rubber test piece, and measuring and calculating the value expressed by (stress at 300% elongation)/(stress at 100% elongation). A greater numeric value indicates higher reinforcing properties of silica and higher operation stability.

[Production Example 1] Preparation of Polymer Block (A1) Having Active Terminal A 800 ml container was purged with nitrogen, and 140.8 g of cyclohexane and 3.0 mmol of tetramethylethylenediamine were added thereto. Further, 30.0 mmol of n-butyllithium was added. In the next step, 113.6 g of isoprene and 9.2 g of styrene were gradually added, and were reacted for 120 minutes in the container at 50° C. to yield a polymer block (A1) having an active terminal. The polymer block (A1) had a weight average molecular weight (Mw) of 6,500 and a molecular weight distribution (Mw/Mn) of 1.10. The styrene monomer unit content was 7.5 wt %, the isoprene monomer unit content was 92.5 wt %, and the vinyl bond content was 7.0 wt %.

[Production Example 2] Preparation of Polymer Block (A2) Having Active Terminal A 800 ml container was purged with nitrogen, and 134.3 g of cyclohexane and 1.0 mmol of tetramethylethylenediamine were added thereto. Further, 10.0 mmol of n-butyllithium was added. In the next step, 36.1 g of isoprene and 2.9 g of styrene were gradually added, and were reacted for 120 minutes in the container at 50° C. to yield a polymer block (A2) having an active terminal. The polymer block (A2) had a weight average molecular weight (Mw) of 5,700 and a molecular weight distribution (Mw/Mn) of 1.09. The styrene monomer unit content was 7.4 wt %, the isoprene monomer unit content was 92.6 wt %, and the vinyl bond content was 7.3 wt %.

Example 1

Under a nitrogen atmosphere, 792 g of cyclohexane, 0.71 mmol of tetramethylethylenediamine, 76.3 g of 1,3-butadiene, 28.7 g of styrene, and 0.144 g of bis(diethylamino) methylvinylsilane (the compound represented by General Formula (1) where $X^1$ is a chemical single bond, $X^2$ and $X^3$ are a diethylamino group, and $X^4$ is a methyl group) were placed into an autoclave with a stirrer, and the polymer block (A1) having an active terminal yielded in Production Example 1 was added in an amount corresponding to a lithium atom content of 0.51 mmol to initiate polymerization at 60° C. The polymerization reaction was continued for 60 minutes. It was confirmed that the polymerization conversion ratio reached a range of 95% to 100%, and methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber and 37.5 parts of an extender oil (trade name "AROMAX T-DAE", available from JXTG Nippon Oil & Energy Corporation) relative to 100 parts of the conjugated diene-based rubber were added to the solution. Thereafter, the solvent was removed by steam stripping, followed by vacuum drying at 60° C. for 24 hours to yield a solid conjugated diene-based rubber. The conjugated diene-based rubber yielded in Example 1 had a weight average molecular weight (Mw) of 431,000. The styrene monomer unit content was 27 wt %, and the vinyl bond content was 59 wt %. The bis(diethylamino)methylvinylsilane monomer unit content was 0.15 wt % in the conjugated diene-based rubber yielded in Example 1.

Example 2

Under a nitrogen atmosphere, 792 g of cyclohexane, 0.71 mmol of tetramethylethylenediamine, 76.3 g of 1,3-butadiene, 28.7 g of styrene, and 0.144 g of bis(diethylamino) methylvinylsilane were placed into an autoclave with a stirrer, and the polymer block (A1) having an active terminal yielded in Production Example 1 was added in an amount corresponding to a lithium atom content of 0.51 mmol to initiate polymerization at 60° C. The polymerization reaction was continued for 60 minutes. It was confirmed that the polymerization conversion ratio reached a range of 95% to 100%, and then 0.35 mmol of N,N-dimethylaminopropylacrylamide (the compound represented by General Formula (8) where $R^{29}$ to $R^{22}$ are a hydrogen atom, $R^{23}$ is a trimethylene group, and $R^{24}$ and $R^{25}$ are a methyl group) was added, and was reacted for 30 minutes. Subsequently, methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber and 37.5 parts of an extender oil (trade name "AROMAX T-DAE", available from JXTG Nippon Oil & Energy Corporation) relative to 100 parts of the conjugated diene-based rubber were added to the solution. Thereafter, the solvent was removed by steam stripping, followed by vacuum drying at 60° C. for 24 hours to yield a solid conjugated diene-based rubber. The resulting conjugated diene-based rubber in Example 2 had a weight average molecular weight (Mw) of 380,000. The styrene monomer unit content was 27 wt %, and the vinyl bond content was 59 wt %. The bis(diethylamino)methylvinylsilane monomer unit content was 0.15 wt % in the conjugated diene-based rubber in Example 2.

Example 3

Under a nitrogen atmosphere, 792 g of cyclohexane, 0.71 mmol of tetramethylethylenediamine, 76.3 g of 1,3-butadiene, 28.7 g of styrene, and 0.144 g of bis(diethylamino) methylvinylsilane were placed into an autoclave with a stirrer, and the polymer block (A1) having an active terminal yielded in Production Example 1 was added in an amount corresponding to a lithium atom content of 0.51 mmol to initiate polymerization at 60° C. The polymerization reaction was continued for 60 minutes. It was confirmed that the polymerization conversion ratio reached a range of 95% to 100%, and then the polyorganosiloxane represented by the following formula (9) was added in an amount of 0.65 mmol in tams of the number of —Si—O— repeating unit, and was reacted for 30 minutes. Subsequently, methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber and 37.5 parts of an extender oil (trade name "AROMAX T-DAE", available from JXTG Nippon Oil & Energy Corporation) relative to 100 parts of the conjugated diene-based rubber were added to the solution. Thereafter, the solvent was removed by steam stripping, followed by vacuum drying at 60° C. for 24 hours to yield a solid conjugated diene-based rubber. The resulting conjugated diene-based rubber in Example 3 had a weight average molecular weight (Mw) of 827,000. The styrene monomer unit content was 27 wt %, and the vinyl bond content was 59 wt %. The bis(diethylamino)methylvinylsilane monomer unit content was 0.15 wt % in the conjugated diene-based rubber in Example 3.

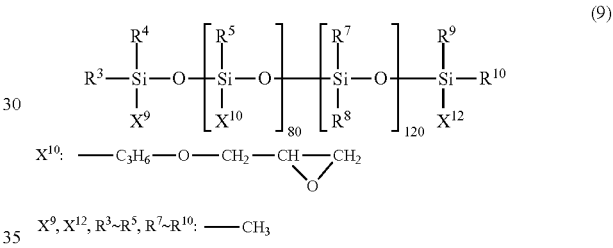

Example 4

Under a nitrogen atmosphere, 792 g of cyclohexane, 0.71 mmol of tetramethylethylenediamine, 76.3 g of 1,3-butadiene, 28.7 g of styrene, and 0.144 g of bis(diethylamino) methylvinylsilane were placed into an autoclave with a stirrer, and the polymer block (A1) having an active terminal yielded in Production Example 1 was added in an amount corresponding to a lithium atom content of 0.51 mmol to initiate polymerization at 60° C. The polymerization reaction was continued for 60 minutes. It was confirmed that the polymerization conversion ratio reached a range of 95% to 100%, and then the polyorganosiloxane represented by General Formula (9) was added in an amount of 1.68 mmol in terms of the number of —Si—O— repeating unit, and was reacted for 20 minutes. Subsequently, 0.89 mmol of n-butyllithium was added, and was reacted for 10 minutes. In the next step, the polyorganosiloxane represented by General Formula (9) was added in an amount of 0.49 mmol in terms of the number of —Si—O— repeating unit, and was reacted for 20 minutes. Subsequently, methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber and 37.5 parts of an extender oil (trade name "AROMAX T-DAE", available from JXTG Nippon Oil & Energy Corporation) relative to 100 parts of the conjugated diene-based rubber were added to the solution.

Thereafter, the solvent was removed by steam stripping, followed by vacuum drying at 60° C. for 24 hours to yield a solid conjugated diene-based rubber. The resulting conjugated diene-based rubber in Example 4 had a weight average molecular weight (Mw) of 563,000. The styrene monomer unit content was 27 wt %, and the vinyl bond content was 59 wt %. The bis(diethylamino)methylvinylsilane monomer unit content was 0.15 wt % in the conjugated diene-based rubber in Example 4.

Example 5

Under a nitrogen atmosphere, 792 g of cyclohexane, 0.71 mmol of tetramethylethylenediamine, 76.3 g of 1,3-butadiene, 28.7 g of styrene, and 0.144 g of bis(diethylamino)methylvinylsilane were placed into an autoclave with a stirrer, and the polymer block (A1) having an active terminal yielded in Production Example 1 was added in an amount corresponding to a lithium atom content of 0.51 mmol to initiate polymerization at 60° C. The polymerization reaction was continued for 60 minutes. It was confirmed that the polymerization conversion ratio reached a range of 95% to 100%, and then 0.89 mmol of n-butyllithium was added, and was reacted for 10 minutes. In the next step, the polyorganosiloxane represented by General Formula (9) was added in an amount of 2.17 mmol in terms of the number of —Si—O— repeating unit, and was reacted for 30 minutes. Subsequently, methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber and 37.5 parts of an extender oil (trade name "AROMAX T-DAE", available from JXTG Nippon Oil & Energy Corporation) relative to 100 parts of the conjugated diene-based rubber were added to the solution. Thereafter, the solvent was removed by steam stripping, followed by vacuum drying at 60° C. for 24 hours to yield a solid conjugated diene-based rubber. The resulting conjugated diene-based rubber in Example 5 had a weight average molecular weight (Mw) of 617,000. The styrene monomer unit content was 27 wt %, and the vinyl bond content was 59 wt %. The bis(diethylamino)methylvinylsilane monomer unit content was 0.15 wt % in the conjugated diene-based rubber in Example 5.

Example 6

Under a nitrogen atmosphere, 792 g of cyclohexane, 0.71 mmol of tetramethylethylenediamine, 76.3 g of 1,3-butadiene, 28.7 g of styrene, and 0.144 g of bis(diethylamino)methylvinylsilane were placed into an autoclave with a stirrer, and the polymer block (A1) having an active terminal yielded in Production Example 1 was added in an amount corresponding to a lithium atom content of 0.51 mmol to initiate polymerization at 60° C. The polymerization reaction was continued for 60 minutes. It was confirmed that the polymerization conversion ratio reached a range of 95% to 100%, and then 0.35 mmol of 3-diethylaminopropyltrimethoxysilane (the compound represented by General Formula (7), where $R^{12}$ is a trimethylene group, $X^{15}$, $X^{16}$, and $X^{17}$ are a methoxy group, and $X^{18}$ and $X^{19}$ are an ethyl group), and were reacted for 20 minutes. In the next step, 0.61 mmol of n-butyllithium was added, and was reacted for 30 minutes. Subsequently, methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber and 37.5 parts of an extender oil (trade name "AROMAX T-DAE", available from JXTG Nippon Oil & Energy Corporation) relative to 100 parts of the conjugated diene-based rubber were added to the solution. Thereafter, the solvent was removed by steam stripping, followed by vacuum drying at 60° C. for 24 hours to yield a solid conjugated diene-based rubber. The resulting conjugated diene-based rubber in Example 6 had a weight average molecular weight (Mw) of 295,000. The styrene monomer unit content was 27 wt %, and the vinyl bond content was 59 wt %. The bis(diethylamino)methylvinylsilane monomer unit content was 0.15 wt % in the conjugated diene-based rubber in Example 6.

Example 7

A conjugated diene-based rubber was prepared in the same manner as in Example 6 except that the amount of bis(diethylamino)methylvinylsilane used in Example 6 was changed to 0.072 g. The resulting conjugated diene-based rubber in Example 7 had a weight average molecular weight (Mw) of 311,000. The styrene monomer unit content was 27 wt %, and the vinyl bond content was 59 wt %. The bis(diethylamino)methylvinylsilane monomer unit content was 0.075 wt % in conjugated diene-based rubber in Example 7.

Comparative Example 1

Under a nitrogen atmosphere, 792 g of cyclohexane, 0.71 mmol of tetramethylethylenediamine, 76.3 g of 1,3-butadiene, and 28.7 g of styrene were placed into an autoclave with a stirrer, and the polymer block (A1) having an active terminal yielded in Production Example 1 was added in an amount corresponding to a lithium atom content of 0.51 mmol to initiate polymerization at 60° C. The polymerization reaction was continued for 60 minutes. It was confirmed that the polymerization conversion ratio reached a range of 95% to 100%, and then methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber and 37.5 parts of an extender oil (trade name "AROMAX T-DAE", available from JXTG Nippon Oil & Energy Corporation) relative to 100 parts of the conjugated diene-based rubber were added to the solution. Thereafter, the solvent was removed by steam stripping, followed by vacuum drying at 60° C. for 24 hours to yield a solid conjugated diene-based rubber. The resulting conjugated diene-based rubber in Comparative Example 1 had a weight average molecular weight (Mw) of 443,000. The styrene monomer unit content was 27 wt %, and the vinyl bond content was 59 wt %.

Comparative Example 2

Under a nitrogen atmosphere, 792 g of cyclohexane, 0.71 mmol of tetramethylethylenediamine, 76.3 g of 1,3-butadiene, 28.7 g of styrene, and 0.144 g of bis(diethylamino)methylvinylsilane were placed into an autoclave with a stirrer, and 0.51 mmol of a compound prepared through a reaction of 3-(dimethylamino)propyllithium with isoprene [reaction proportion: isoprene/3-(dimethylamino)propyllithium=2/1 (molar ratio), available from FMC Corporation, trade name "AI-200CE2", molecular weight=229, the compound represented by General Formula (10)] to initiate polymerization at 60° C. The polymerization reaction was continued for 60 minutes. It was confirmed that the polymerization conversion ratio reached a range of 95% to 100%, and then methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber and 37.5 parts of an extender oil (trade name "AROMAX T-DAE", available from JXTG Nippon Oil & Energy Corporation) relative to 100 parts of the conjugated diene-based rubber were added to the solution. Thereafter, the solvent was removed by steam stripping, followed by vacuum drying at 60° C. for 24 hours to yield a solid conjugated diene-based rubber. The resulting conjugated diene-based rubber in Comparative Example 2 had a weight average molecular weight (Mw) of 400,000. The styrene monomer unit content was 27 wt %, and the vinyl bond content was 59 wt %. The bis(diethylamino)methylvinylsilane monomer unit content was 0.15 wt % in the conjugated diene-based rubber in Comparative Example 2.

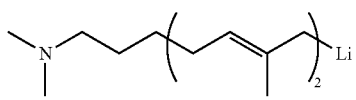

(10)

Comparative Example 3

Under a nitrogen atmosphere, 792 g of cyclohexane, 0.71 mmol of tetramethylethylenediamine, 76.3 g of 1,3-butadiene, 28.7 g of styrene, and 0.144 g of bis(diethylamino)methylvinylsilane were placed into an autoclave with a stirrer, and 0.51 mmol of n-butyllithium was added to initiate polymerization at 60° C. The polymerization reaction was continued for 60 minutes. It was confirmed that the polymerization conversion ratio reached a range of 95% to 100%, and then methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber and 37.5 parts of an extender oil (trade name "AROMAX T-DAE", available from JXTG Nippon Oil & Energy Corporation) relative to 100 parts of the conjugated diene-based rubber were added to the solution. Thereafter, the solvent was removed by steam stripping, followed by vacuum drying at 60° C. for 24 hours to yield a solid conjugated diene-based rubber. The resulting conjugated diene-based rubber in Comparative Example 3 had a weight average molecular weight (Mw) of 420,000. The styrene monomer unit content was 27 wt %, and the vinyl bond content was 59 wt %. The bis(diethylamino)methylvinylsilane monomer unit content was 0.15 wt % in the conjugated diene-based rubber in Comparative Example 3.

Production and Evaluation of Rubber Composition and Cross-Linked Rubber

In a 250-ml Brabender type mixer, 137.5 parts of the conjugated diene-based rubber in Example 1 (which constitutes 100 parts of the rubber ingredient) was masticated for 30 seconds. In the next step, 50 parts of silica (available from Rhodia S.A., trade name "Zeosil 1115MP") and 6.0 parts of bis(3-(triethoxysilyl)propyl)tetrasulfide as a silane coupling agent (available from Degussa AG, trade name "Si69") were added, and were kneaded for 1.5 minutes at a starting temperature of 110° C. Thereafter, 25 parts of silica (available from Rhodia S.A., trade name "Zeosil 1115MP"), 3 parts of zinc oxide, 2 parts of stearic acid, and 2 parts of N-phenyl-N'-(1,3-dimethylbutyl)-p-phenylenediamine as an antioxidant (available from Ouchi Shinko Chemical Industrial Co., Ltd., trade name "NOCRAC 6C") were added, and were further kneaded for 2.5 minutes. The kneaded product was discharged from the mixer. When the kneading was completed, the temperature of the kneaded product was 150° C. After cooled to room temperature, the kneaded product was kneaded for 2 minutes at a starting temperature of 110° C. in the Brabender type mixer, and was discharged from the mixer. In the next step, 1.40 parts of sulfur, 1.2 parts of N-tert-butyl-2-benzothiazolylsulfenamide as a cross-linking accelerator (trade name "NOCCELER NS-P", available from Ouchi Shinko Chemical Industrial Co., Ltd.) and 1.2 parts of 1,3-diphenylguanidine (trade name "NOCCELER D", available from Ouchi Shinko Chemical Industrial Co., Ltd.) were added to and kneaded with the kneaded product with a 50° C. open roll mill to prepare a rubber composition.

The resulting rubber composition was shaped into a sheet with the 50° C. open roll mill. At this time, the roll adhesion of the rubber composition was evaluated according to the method described above. The results are shown in Table 1.

The sheet-shaped rubber composition was press cross-linked at 160° C. for 20 minutes to prepare a cross-linked rubber test piece. Using this test piece, the wet grip, the heat buildup, and the operation stability were evaluated. The results are shown in Table 1.

For the conjugated diene-based rubbers in Examples 2 to 7 and Comparative Examples 1 to 3, the preparation of rubber compositions and the evaluation of the roll adhesion of the rubber compositions were performed in the same manner as above. The preparation of cross-linked rubber test pieces and the evaluation of the wet grip, the heat buildup, and the operation stability were also performed in the same manner as above. The results are shown in Table 1.

TABLE 1

| | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Formation of polymer block (A) | Yes | Yes | Yes | Yes | Yes | Yes | Yes | Yes | Yes (Compound of General Formula (9) was used) | No |
| Weight average molecular weight (Mw) of polymer block (A) | 6,500 | 6,500 | 6,500 | 6,500 | 6,500 | 6,500 | 6,500 | 6,500 | 229 (Molecular weight of Compound of General Formula (9)) | — |
| Vinyl compound having functional group interactive with silica | 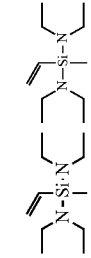 | 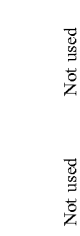 | | | | | | Not used | | |
| Content (wt %) of unit of vinyl compound having functional group interactive with silica | 0.15 | 0.15 | 0.15 | 0.15 | 0.15 | 0.15 | 0.075 | 0 | 0.15 | 0.15 |
| Hetero atom-containing compound | Not used | | Polyorgano siloxane | Polyorgano siloxane | Polyorgano siloxane | 3-Diethylamino-propyltrimeth-oxysilane | 3-Diethylamino-propyltrimeth-oxysilane | Not used | Not used | Not used |
| Weight average molecular weight (Mw) of entire conjugated diene-based rubber | 431,000 | 380,000 | 827,000 | 563,000 | 617,000 | 295,000 | 311,000 | 443,000 | 400,000 | 420,000 |
| Roll adhesion | A | A | A | A | A | A | A | F | F | F |
| Wet grip | 109 | 107 | 111 | 102 | 105 | 102 | 101 | 81 | 99 | 100 |
| Heat buildup | 76 | 74 | 70 | 72 | 74 | 60 | 63 | 122 | 81 | 100 |
| Operation stability (300% tensile stress/100% tensile stress) | 5.80 | 5.80 | 5.64 | 5.53 | 5.52 | 5.42 | 5.37 | 4.85 | 4.84 | 5.36 |

Evaluation of Examples 1 to 7 and Comparative Examples 1 to 3

Table 1 shows the followings: In the conjugated diene-based rubbers comprising the polymer block (A) containing the isoprene monomer unit as the main component and the polymer block (B) containing the 1,3-butadiene monomer unit as the main component, and containing the unit of the vinyl compound having a functional group interactive with silica in the polymer chain, the weight average molecular weight of the polymer block (A) and the weight average molecular weight of the entire conjugated diene-based rubber being within the predetermined ranges, the adhesion of the rubber compositions prepared from the conjugated diene-based rubbers to rolls were effectively prevented, resulting in high processability. Furthermore, the cross-linked rubbers prepared using these had low heat buildup, high operation stability, and high wet grip (Examples 1 to 7).

In contrast, in the case where the conjugated diene-based rubber not containing the unit of the vinyl compound having a functional group interactive with silica in the polymer chain was used, the resulting rubber composition remarkably adhered to the rolls, and the resulting cross-linked rubber had poor heat buildup and poor operation stability (Comparative Example 1).

Similarly, in the case where the conjugated diene-based rubber comprising the polymer block (A) containing the isoprene monomer unit as the main component and having an excessively small weight average molecular weight was used and the case where the conjugated diene-based rubber not containing the polymer block (A) was used, the resulting rubber compositions remarkably adhered to the rolls, and the resulting cross-linked rubbers had poor heat buildup and poor operation stability (Comparative Examples 2 and 3).

Example 8

A solid conjugated diene-based rubber was prepared in the same manner as in Example 2 except that 0.35 mmol of N,N-dimethylaminopropylacrylamide in Example 2 was replaced with 0.35 mmol of 3-[bis(trimethylsilyl)amino]propyl(dimethoxy) (methyl)silane (the compound represented by General Formula (7) where $R^{12}$ is a trimethylene group, $X^{15}$ and $X^{16}$ are a methoxy group, $X^{17}$ is a methyl group, and $X^{18}$ and $X^{19}$ are a trimethylsilyl group). The resulting conjugated diene-based rubber in Example 8 had a weight average molecular weight (Mw) of 482,000. The styrene monomer unit content was 27 wt %, and the vinyl bond content was 58 wt %. The bis(diethylamino)methylvinylsilane monomer unit content was 0.15 wt % in the conjugated diene-based rubber in Example 8.

Example 9

A solid conjugated diene-based rubber was prepared in the same manner as in Example 2 except that 0.35 mmol of N,N-dimethylaminopropylacrylamide in Example 2 was replaced with 0.35 mmol of 2,2-dimethoxy-1-[3-(trimethoxysilyl)propyl]-1,2-azasilolidine (the compound represented by General Formula (7) where $R^{12}$ is a trimethylene group, $X^{15}$ and $X^{16}$ are a methoxy group, and $X^{18}$ is a 3-(trimethoxysilyl)propyl group; and the silicon atom and the nitrogen atom in General Formula (7) are directly covalently bonded without $X^{17}$ and $X^{19}$). The resulting conjugated diene-based rubber in Example 9 had a weight average molecular weight (Mw) of 624,000. The styrene monomer unit content was 27 wt %, and the vinyl bond content was 58 wt %. The bis(diethylamino)methylvinylsilane monomer unit content was 0.15 wt % in the conjugated diene-based rubber in Example 9.

For the conjugated diene-based rubbers in Examples 8 and 9, the preparation of rubber compositions and the evaluation of the roll adhesion of the rubber compositions were performed in the same manner as in Example 1. The preparation of cross-linked rubber test pieces and the evaluation of the heat buildup and the operation stability were also performed in the same manner as in Example 1. The results are shown in Table 2. For comparison, the results of Comparative Example 1 are also shown in Table 2.

TABLE 2

|  | Example 8 | Example 9 | Comparative Example 1 |
|---|---|---|---|
| Formation of polymer block (A) | Yes | Yes | Yes |
| Weight average molecular weight (Mw) of polymer block (A) | 6,500 | 6,500 | 6,500 |
| Vinyl compound having functional group interactive with silica | (structure) | (structure) | Not used |
| Content (wt %) of unit of vinyl compound having functional group interactive with silica | 0.15 | 0.15 | 0 |
| Hetero atom-containing compound | 3-[Bis(trimethylsilyl)amino]propyl(dimethoxy)(methyl)silane | 2,2-Dimethoxy-1-[3-(trimethoxysilyl)propyl]-1,2-azasilolidine | Not used |
| Weight average molecular weight (Mw) of entire conjugated diene-based rubber | 482,000 | 624,000 | 443,000 |
| Roll adhesion | A | A | F |
| Heat buildup | 68 | 81 | 122 |
| Operation stability (300% tensile stress/100% tensile stress) | 5.84 | 5.43 | 4.85 |

Evaluation of Examples 8 and 9

Table 2 shows that also in the case where the compound represented by General Formula (7) was used as the hetero atom-containing compound, the adhesion of the resulting rubber compositions to the rolls was effectively prevented, resulting in high processability. Furthermore, the resulting cross-linked rubbers had low heat buildup and high operation stability (Examples 8 and 9).

Example 10

A solid conjugated diene-based rubber was prepared in the same manner as in Example 1 except that 0.144 g of bis(diethylamino)methylvinylsilane in Example 1 was replaced with 0.135 g of m/p-pyrrolidinoethylstyrene (a mixture of m-pyrrolidinoethylstyrene and p-pyrrolidinoethylstyrene). The resulting conjugated diene-based rubber in Example 10 had a weight average molecular weight (Mw) of 470,000. The styrene monomer unit content was 27 wt %, and the vinyl bond content was 58 wt %. The m/p-pyrrolidinoethylstyrene monomer unit content was 0.13 wt % in the conjugated diene-based rubber in Example 10.

Comparative Example 4

A solid conjugated diene-based rubber was prepared in the same manner as in Comparative Example 3 except that 0.144 g of bis(diethylamino)methylvinylsilane in Comparative Example 3 was replaced with 0.135 g of m/p-pyrrolidinoethylstyrene. The resulting conjugated diene-based rubber in Comparative Example 4 had a weight average molecular weight (Mw) of 246,000. The styrene monomer unit content was 27 wt %, and the vinyl bond content was 59 wt %. The pyrrolidinoethylstyrene monomer unit content was 0.13 wt % in the conjugated diene-based rubber in Comparative Example 4.

Also in the conjugated diene-based rubbers in Example 10 and Comparative Example 4, the preparation of rubber compositions and the evaluation of the roll adhesion of the rubber compositions were performed in the same manner as in Example 1. The preparation of cross-linked rubber test pieces and the evaluation of the heat buildup and the operation stability were also performed in the same manner as in Example 1. The results are shown in Table 3.

TABLE 3

| | Example 10 | Comparative Example 4 |
|---|---|---|
| Formation of polymer block (A) | Yes | No |
| Weight average molecular weight (Mw) of polymer block (A) | 6,500 | — |
| Vinyl compound having functional group interactive with silica | m/p-Pyrrolidino-ethylstyrene | m/p-Pyrrolidino-ethylstyrene |
| Content (wt %) of unit of vinyl compound having functional group interactive with silica | 0.13 | 0.13 |
| Hetero atom-containing compound | Not used | Not used |
| Weight average molecular weight (Mw) of entire conjugated diene-based rubber | 470,000 | 246,000 |
| Roll adhesion | A | F |
| Heat buildup | 84 | 100 |
| Operation stability (300% tensile strress/100% tensile stress) | 5.02 | 4.98 |

Evaluation of Example 10 and Comparative Example 4

Table 3 shows that also in the case where m/p-pyrrolidinoethylstyrene was used as the vinyl compound having a functional group interactive with silica, the adhesion of the rubber composition to the roll was effectively prevented, resulting in high processability. Furthermore, the cross-linked rubber prepared using this had low heat buildup and high operation stability (Example 10).

In contrast, in the case where the conjugated diene-based rubber not comprising the polymer block (A) containing the isoprene monomer unit as the main component was used although m/p-pyrrolidinoethylstyrene was used as the vinyl compound having a functional group interactive with silica, the resulting rubber composition remarkably adhered to the roll, and the resulting cross-linked rubber had poor heat buildup and poor operation stability (Comparative Example 4).

Example 11

Under a nitrogen atmosphere, 830 g of cyclohexane, 1.28 mmol of tetramethylethylenediamine, 80.3 g of 1,3-butadiene, 29.7 g of styrene, and 0.132 g of bis(diethylamino) methylvinylsilane were placed into an autoclave with a stirrer, and the polymer block (A2) having an active terminal prepared in Production Example 2 was added in an amount corresponding to a lithium atom content of 0.80 mmol to initiate polymerization at 60° C. The polymerization reaction was continued for 60 minutes. It was confirmed that the polymerization conversion ratio reached a range of 95% to 100%, and then 0.30 mmol of N,N-dimethylaminopropylacrylamide (the compound represented by General Formula (8) where $R^{29}$, $R^{20}$, $R^{21}$, and $R^{22}$ are a hydrogen atom, $R^{23}$ is a trimethylene group, and $R^{24}$ and $R^{25}$ are a methyl group) was added, and was reacted for 15 minutes. In the next step, 0.30 mmol of 3-diethylaminopropyltrimethoxysilane was added, and was reacted for 30 minutes. Subsequently, methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber was added to the solution. Thereafter, the solvent was removed by steam stripping, followed by vacuum drying at 60° C. for 24 hours to yield a solid conjugated diene-based rubber. The resulting conjugated diene-based rubber in Example 11 had a weight average molecular weight (Mw) of 380,000. The styrene monomer unit content was 27 wt %, and the vinyl bond content was 57 wt %. The bis(diethylamino)methylvinylsilane monomer unit content was 0.12 wt % in the conjugated diene-based rubber in Example 11.

Example 12

Under a nitrogen atmosphere, 830 g of cyclohexane, 1.28 mmol of tetramethylethylenediamine, 80.3 g of 1,3-butadiene, 29.7 g of styrene, and 0.066 g of bis(diethylamino) methylvinylsilane were placed into an autoclave with a stirrer, and the polymer block (A2) having an active terminal prepared in Production Example 2 was added in an amount corresponding to a lithium atom content of 0.80 mmol to initiate polymerization at 60° C. The polymerization reaction was continued for 60 minutes. It was confirmed that the polymerization conversion ratio reached a range of 95% to 100%, and then 0.30 mmol of N-phenylpyrrolidone was added, and was reacted for 15 minutes. In the next step, the polyorganosiloxane represented by General Formula (9) was added in an amount of 0.33 mmol in terms of the number —Si—O— repeating unit, and was reacted for 30 minutes. Subsequently, methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber was added to the solution. Thereafter, the solvent was removed by steam stripping, followed by vacuum drying at 60° C. for 24 hours to yield a solid conjugated diene-based rubber. The resulting conjugated diene-based rubber in Example 12 had a weight average molecular weight (Mw) of 506,000. The styrene monomer unit content was 26 wt %, and the vinyl bond content was 58 wt %. The bis(diethylamino)methylvinylsilane monomer unit content was 0.060 wt % in the conjugated diene-based rubber in Example 12.

Comparative Example 5

Under a nitrogen atmosphere, 830 g of cyclohexane, 1.28 mmol of tetramethylethylenediamine, 80.3 g of 1,3-butadiene, 29.7 g of styrene, and 0.132 g of bis(diethylamino)methylvinylsilane were placed into an autoclave with a stirrer, and 0.80 mmol of n-butyllithium was added to initiate polymerization at 60° C. The polymerization reaction was continued for 60 minutes. It was confirmed that the polymerization conversion ratio reached a range of 95% to 100%, and then 0.30 mmol of N-phenylpyrrolidone was added, and was reacted for 15 minutes. In the next step, 0.30 mmol of 1,3,5-tris(trimethoxysilylpropyl)isocyanurate was added, and was reacted for 30 minutes. Subsequently, methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber was added to the solution. Thereafter, the solvent was removed by steam stripping, followed by vacuum drying at 60° C. for 24 hours to yield a solid conjugated diene-based rubber. The resulting conjugated diene-based rubber in Comparative Example 5 had a weight average molecular weight (Mw) of 385,000. The styrene monomer unit content was 27 wt %, and the vinyl bond content was 58 wt %. The bis(diethylamino)methylvinylsilane monomer unit content was 0.12 wt % in the conjugated diene-based rubber in Comparative Example 5.

Comparative Example 6

Under a nitrogen atmosphere, 830 g of cyclohexane, 1.28 mmol of tetramethylethylenediamine, 0.61 mmol of piperidine, 80.3 g of 3-butadiene, 29.7 g of styrene, and 0.066 g of bis(diethylamino)methylvinylsilane were placed into an autoclave with a stirrer, and 0.80 mmol of n-butyllithium was added to initiate polymerization at 60° C. The polymerization reaction was continued for 60 minutes. It was confirmed that the polymerization conversion ratio reached a range of 95% to 100%, and then 0.30 mmol of N,N-dimethylaminopropylacrylamide was added, and was reacted for 15 minutes. In the next step, 0.30 mmol of 1,3,5-tris(trimethoxysilyl propyl)isocyanurate was added, and was reacted for 30 minutes. Subsequently, methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber was added to the solution. Thereafter, the solvent was removed by steam stripping, followed by vacuum drying at 60° C. for 24 hours to yield a solid conjugated diene-based rubber. The resulting conjugated diene-based rubber in Comparative Example 6 had a weight average molecular weight (Mw) of 245,000. The styrene monomer unit content was 26 wt %, and the vinyl bond content was 59 wt %. The bis(diethylamino)methylvinylsilane monomer unit content was 0.060 wt % in the conjugated diene-based rubber in Comparative Example 6.

Comparative Example 7

Under a nitrogen atmosphere, 830 g of cyclohexane, 1.28 mmol of tetramethylethylenediamine, 80.3 g of 1,3-butadiene, and 29.7 g of styrene were placed into an autoclave with a stirrer, and the polymer block (A2) having an active terminal was added in an amount corresponding to a lithium atom content of 0.80 mmol to initiate polymerization at 60° C. The polymerization reaction was continued for 60 minutes. It was confirmed that the polymerization conversion ratio reached a range of 95% to 100%, and then 0.61 mmol of 1,3,5-tris(trimethoxysilylpropyl)isocyanurate was added, and was reacted for 30 minutes. Subsequently, methanol as a polymerization terminator was added in a 2-fold equimolar amount to the amount of n-butyllithium used to prepare a solution containing the conjugated diene-based rubber. 0.15 parts of an antioxidant (trade name "Irganox 1520L", available from BASF SE) relative to 100 parts of the conjugated diene-based rubber was added to the solution. Thereafter, the solvent was removed by steam stripping, followed by vacuum drying at 60° C. for 24 hours to yield a solid conjugated diene-based rubber. The resulting conjugated diene-based rubber in Comparative Example 7 had a weight average molecular weight (Mw) of 499,000. The styrene monomer unit content was 28 wt %, and the vinyl bond content was 58 wt %.

Also for the conjugated diene-based rubbers in Examples 11 and 12 and Comparative Examples 5 to 7, the cross-linked rubber test pieces were prepared in the same manner as in Example 1 to evaluate the heat buildup. The results are shown in Table 4.

TABLE 4

|  | Example 11 | Example 12 | Comparative Example 5 | Comparative Example 6 | Comparative Example 7 |
|---|---|---|---|---|---|
| Formation of polymer block (A) | Yes | Yes | No | No | Yes |
| Weight average molecular weight (Mw) of polymer block (A) | 5,700 | 5,700 | — | — | 5,700 |

TABLE 4-continued

| | Example 11 | Example 12 | Comparative Example 5 | Comparative Example 6 | Comparative Example 7 |
|---|---|---|---|---|---|
| Modification of terminal on starting side | — | — | — | Piperidine | — |
| Vinyl compound having functional group interactive with silica | [N—Si—N structure with vinyl] | [N—Si—N structure with vinyl] | [N—Si—N structure with vinyl] | [N—Si—N structure with vinyl] | Not used |
| Content (wt %) of unit of vinyl compound having functional group interactive with silica | 0.12 | 0.060 | 0.12 | 0.060 | 0 |
| Hetero atom-containing compound 1 | [acrylamide structure] | N-phenylpyrrolidone | N-phenylpyrrolidone | N,N-dimethylamino-propylacrylamide | 1,3,5-Tris(trimethoxysilylpropyl)isocyanurate |
| Hetero atom-containing compound 2 | 3-Diethylaminopropyl trimethoxysilane | Polyorganosiloxane | 1,3,5-Tris(trimethoxy-silylpropyl)isocyanurate | 1,3,5-Tris(trimethoxy-silylpropyl)isocyanurate | Not used |
| Weight average molecular weight (Mw) of entire conjugated diene-based rubber | 380,000 | 506,000 | 385,000 | 245,000 | 499,000 |
| Heat buildup | 94 | 87 | 100 | 99 | 101 |

Evaluation of Examples 11 and 12 and Comparative Examples 5 to 7

Table 4 shows that also in the case where the two compounds were used as the hetero atom-containing compounds and were sequentially reacted, the cross-linked rubbers prepared from the thus-prepared conjugated diene-based rubbers had low heat buildup (Examples 11 and 12). Similarly to Examples 1 to 7, also for Examples 11 and 12, the adhesion of the resulting rubber compositions to the rolls was effectively prevented, resulting in high processability. Furthermore, the cross-linked rubbers prepared using these had high operation stability in addition to the low heat buildup.

In contrast, in the case where the conjugated diene-based rubbers not comprising the polymer block (A) containing the isoprene monomer unit as the main component were used or the vinyl compound having a functional group interactive with silica was not copolymerized although two compounds were used as the hetero atom-containing compounds, the resulting cross-linked rubbers had poor heat buildup (Comparative Examples 5 to 7).

The invention claimed is:

1. A conjugated diene-based rubber comprising a polymer block (A) containing isoprene monomer unit as the main component, and a polymer block (B) containing 1,3-butadiene monomer unit as the main component,
wherein at least one of the polymer block (A) and the polymer block (B) contains a unit of a vinyl compound having a silicon atom-containing functional group,
the proportion of the unit of the vinyl compound having the silicon atom-containing functional group is 0.01 to 20 wt % of the total monomer units forming the conjugated diene-based rubber, and
the polymer block (A) has a weight average molecular weight (Mw) in the range of 1,000 to 30,000, and the entire conjugated diene-based rubber has a weight average molecular weight (Mw) in the range of 50,000 to 5,000,000.

2. The conjugated diene-based rubber according to claim 1, wherein at least one of the polymer block (A) and the polymer block (B) contains aromatic vinyl monomer unit.

3. The conjugated diene-based rubber according to claim 1, wherein the polymer block (B) has a hetero atom-containing terminal functional group.

4. A method of producing the conjugated diene-based rubber according to claim 1, the method comprising the steps of:
polymerizing a monomer (a) including isoprene in an inert solvent in the presence of a polymerization initiator to form the polymer block (A) having an active terminal; and
mixing and continuously polymerizing the polymer block (A) having an active terminal with a monomer (b) including 1,3-butadiene to yield a conjugated diene-based polymer chain including the polymer block (A) and the polymer block (B) and having an active terminal,
wherein at least one of the monomer (a) and the monomer (b) contains a vinyl compound having a functional group interactive with silica.

5. The method of producing the conjugated diene-based rubber according to claim 4, the method further comprising a step of reacting a hetero atom-containing compound with the active terminal of the conjugated diene-based polymer chain having an active terminal.

6. A rubber composition comprising a rubber ingredient containing the conjugated diene-based rubber according to claim 1, and silica.

7. The rubber composition according to claim 6, further comprising a cross-linking agent.

8. A cross-linked rubber prepared by cross-linking the rubber composition according to claim 6.

9. A tire comprising the cross-linked rubber according to claim 8.

\* \* \* \* \*